US008335753B2

(12) United States Patent
Rappaport et al.

(10) Patent No.: US 8,335,753 B2
(45) Date of Patent: *Dec. 18, 2012

(54) DOMAIN KNOWLEDGE-ASSISTED INFORMATION PROCESSING

(75) Inventors: Alain Thierry Rappaport, Woodside, CA (US); Daniel Ryan Adamson, Toronto (CA); Leo Li-Hong Shih, Palo Alto, CA (US); Timothy Byung Choe, Belmont, CA (US)

(73) Assignee: Microsoft Corporation, Redmond, WA (US)

( * ) Notice: Subject to any disclaimer, the term of this patent is extended or adjusted under 35 U.S.C. 154(b) by 1022 days.

This patent is subject to a terminal disclaimer.

(21) Appl. No.: 11/835,779

(22) Filed: Aug. 8, 2007

(65) Prior Publication Data

US 2008/0091633 A1   Apr. 17, 2008

Related U.S. Application Data

(63) Continuation-in-part of application No. 11/265,994, filed on Nov. 3, 2005, now Pat. No. 7,542,969.

(60) Provisional application No. 60/624,558, filed on Nov. 3, 2004, provisional application No. 60/677,620, filed on May 4, 2005, provisional application No. 60/723,642, filed on Oct. 4, 2005, provisional application No. 60/838,314, filed on Aug. 17, 2006.

(51) Int. Cl.
*G06N 5/00* (2006.01)
(52) U.S. Cl. ............... 706/45; 707/765; 707/706
(58) Field of Classification Search ............ 706/45; 707/706, 765
See application file for complete search history.

(56) References Cited

U.S. PATENT DOCUMENTS

| 6,516,312 | B1 | 2/2003 | Kraft et al. | |
|---|---|---|---|---|
| 6,789,076 | B1 | 9/2004 | Dutta | |
| 6,920,448 | B2 | 7/2005 | Kincaid et al. | |
| 6,944,611 | B2 | 9/2005 | Flank et al. | |
| 7,065,500 | B2 | 6/2006 | Singh et al. | |
| 7,117,207 | B1 | 10/2006 | Kerschberg et al. | |
| 7,299,222 | B1 | 11/2007 | Hogan et al. | |
| 7,617,196 | B2 * | 11/2009 | Dettinger et al. | 1/1 |
| 7,774,333 | B2 * | 8/2010 | Colledge et al. | 707/708 |
| 2002/0129015 | A1 | 9/2002 | Caudill et al. | |

(Continued)

FOREIGN PATENT DOCUMENTS

KR    20020092843 A    12/2002

OTHER PUBLICATIONS

Kerschberg et al ("A semantic taxonomy-based personalizable metasearch agent" WISE 2001) Downloaded at http://citeseerx.ist.psu.edu/viewdoc/summary?doi=10.1.1.88.8748.*

(Continued)

*Primary Examiner* — Lut Wong
(74) *Attorney, Agent, or Firm* — Hope Baldauff Hartman, LLC

(57) ABSTRACT

A modeling system enriched with information from a single source (or multiple sources) that allows for the intelligent extension, formulation or reformulation of a request into various processes including but not limited to transmission, discovery, notification, searching, filtering and storing processes is provided. The innovation builds a network of connected information in a specific domain (or group of domains). Additionally, the system enhances the quality and specificity of the results for queries made in various systems including, but not limited to, search engines.

19 Claims, 24 Drawing Sheets

U.S. PATENT DOCUMENTS

| | | | |
|---|---|---|---|
| 2003/0115191 A1 | 6/2003 | Copperman et al. | |
| 2004/0034652 A1 | 2/2004 | Hofmann et al. | |
| 2004/0199491 A1 | 10/2004 | Bhatt | |
| 2004/0220905 A1 | 11/2004 | Chen et al. | |
| 2005/0144065 A1* | 6/2005 | Calabria et al. | 705/14 |
| 2005/0222901 A1 | 10/2005 | Agarwal et al. | |
| 2006/0004732 A1 | 1/2006 | Odom | |
| 2006/0047649 A1 | 3/2006 | Liang | |
| 2006/0106793 A1 | 5/2006 | Liang | |
| 2006/0136403 A1 | 6/2006 | Koo | |
| 2006/0230033 A1 | 10/2006 | Halevy et al. | |
| 2007/0050343 A1 | 3/2007 | Siddaramappa et al. | |

OTHER PUBLICATIONS

Widyantoro et al ("Using Fuzzy Ontology for Query Refinement in a Personalized Abstract Search Engine" IFSA World Congress and 20th NAFIPS International Conference, 2001).*

Jeonghee Yi, et al. Metadata based Web mining for relevance. 0-7695-0789-1/00, IEEE. http://ieeexplore.ieee.org/iel5/7062/19044/00880569.pdf. Last accessed Sep. 4, 2007, 9 pages.

I. Kompatsiaris, et al. Integrating knowledge, semantics and content for user-centred intelligent media services: the acemedia project http://mkg.iti.gr/publications/wiamis04_acemedia.pdf. Last accessed Sep. 4, 2007, 4 pages.

David Vallet, et al. Personalized Content Retrieval in Context Using Ontological Knowledge http://66.102.1.104/scholar?hl=en&lr=&q=cache:nl5dxm8qoVUJ:nets.ii.uam.es/~acemedia/publications/tcsvt-sicvir06.pdf. Last accessed Sep. 4, 2007, 10 pages.

Notess. "Review of Hotbot (Inktomil)" Feb. 21, 2008, Internet Wayback Machine Oct. 28, 2004. http://web:archive.org/web/2004/028102910/www.searchengineshowdown.com/features/hotbot> 5 pages.

OA Dated Jul. 31, 2008 for U.S. Appl. No. 11/543,017, 25 pages.
OA dated Feb. 7, 2008 for U.S. Appl. No. 11/265,994, 23 pages.
OA dated Aug. 21, 2009 for U.S. Appl. No. 11/543,017, 22 pages.
OA dated Jul. 28, 2008 for U.S. Appl. No. 11/265,994, 36 pages.
OA dated Mar. 7, 2008 for U.S. Appl. No. 11/543,017, 21 pages.
Protege' 2000 product User Guide A4, selected pages taken from Oct. 8, 2003 version of http://protege.stanford.edu accessed via www.archive.org. User Guide can be downloaded from http://protege.standford.edu/useit.html. Last accessed Feb. 7, 2008, 122 pages.
OA dated May 19, 2009 for U.S. Appl. No. 11/543,017, 22 pages.
Notice of Allowance dated Jan. 27, 2009 in U.S. Appl. No. 11/265,994.
Notice of Allowance dated Jan. 21, 2010 in U.S. Appl. No. 11/543,017.

* cited by examiner

CompoundTemplate
    genericName = includeInDomainFocus
    projectName = includeInDomainFocus
    commercialName = includeInDomainFocus           — 801

CompoundTemplate
    genericName = includeAllAsSynonyms
    projectName = includeAllAsSynonyms
    commercialName = includeAllAsSynonyms           — 802

CompoundTemplate
    genericName = includeInConceptExpansion
    projectName = includeInConceptExpansion
    commercialName = includeInConceptExpansion      — 803

FIG. 8

|  | BASEBALL 1506 | BASKETBALL 1508 |
|---|---|---|
| BABE RUTH 1502 | 2 | 0 |
| MICHAEL JORDAN 1504 | 1 | 2 |

DOMAIN KNOWLEDGE-ASSISTED INFORMATION PROCESSING

CROSS-REFERENCE TO RELATED APPLICATIONS

This application is a continuation-in-part of U.S. application Ser. No. 11/265,994, filed Nov. 3, 2005, now U.S. Pat. No. 7,542,969, which claims the benefit of U.S. Provisional Application No. 60/624,558, filed Nov. 3, 2004, U.S. Provisional Application No. 60/677,620, filed May 4, 2005, and U.S. Provisional Application No. 60/723,642, filed Oct. 4, 2005, all of which are incorporated by reference herein. This application also claims the benefit of U.S. Provisional Application No. 60/838,314, filed Aug. 17, 2006 which is also incorporated by reference herein.

BACKGROUND

When applied to specific domains and industries (for example healthcare, finance, law, science) traditional search systems are handicapped by approaches to storing, searching, transmitting, and publishing data and/or services that lack domain or industry specificity. Users (e.g., the people or computer system executing a search or publishing information) are frequently unable to obtain satisfying results using traditional search systems. For example, a search engine ranking documents based on a popularity measure but without domain knowledge may not be able to rank documents at the top of the list when they are relevant rather than popular. To be successful, such engines increasingly require that the user have knowledge about the domain in question to an extent that is both prohibitive and unreasonable.

Platforms for publishing (e.g., websites, etc.) have used techniques such as indexing and meta-tagging with meta-data to increase the descriptive power and indexation of documents to increase the likelihood that they are retrieved easily. However, these and other techniques have issues such as naming inconsistencies, inadequate or arguable choices of descriptive fields and difficulty in the maintenance of large vocabularies. Issues such as these have plagued the field of information extraction, search and distribution.

Using an ontology system is one approach to help manage these challenges. However, one limitation of a traditional ontology is that the concepts and relationships in many domains is dynamic and evolving so that the creation and ongoing maintenance of an ontology is time-consuming and labor-intensive. As a result, the practical application of a traditional ontology is limited.

As an example, to create a traditional ontology to a search system in the sports domain, one might model basic concepts and relationships such as 1) the type of sport, 2) the teams within each sport, and 3) the players and coaches for each team. Even in this example, the creation and maintenance of this ontology across a small number of sports may require the modeling of hundreds of teams and thousands of players and coaches. A complete and up-to-date ontology may require historical information and the models would need to be updated whenever the teams within a sport expanded or contracted or whenever a player or coach was drafted or hired, changed teams, or retired.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a modeling system enriched with information from a single source (or multiple sources) that allows for the intelligent extension, formulation or reformulation of a request into various processes including but not limited to transmission, discovery, notification, searching, filtering and storing processes. Embodiments of the innovation build a network of connected information in a specific domain. In one embodiment, a system is provided that enhances the quality and specificity of the results for queries made in various systems including, but not limited to, search engines. Furthermore, the innovation allows for definitions of workflow, searches and/or event subscription based on queries defined by or provided to the system.

This innovation relates generally to the field of information processing and to information modeling systems. More particularly, this innovation relates to a method, process, apparatus, and system for establishing a search platform for finding, discovering, identifying, connecting, publishing, describing, filtering, processing, storing, defining workflow and/or notifying based on underlying ontology-based domain knowledge and statistical and numerical models.

To accomplish this increase in power of systems, the innovation, in one embodiment, includes the following: at least one tool capable of representing the domain; at least one tool capable of storing, processing, searching, publishing and/or transmitting information and/or data from multiple sources on components of the domain (including but not limited to objects, classes, database tables); and at least one service to generate statistical and/or numerical information on the components of the domain.

In one embodiment, a human modeler assisted by at least one tool or an electronic system assisted by at least one tool, creates a database of domain-specific components, or ontology, by interacting with a computer using input and output devices. At least one tool acquires information pertinent to each component from one or more sources. The system utilizes this information for use with one or more search, publication, discovery, and/or notification services.

For example, a user can provide a query intended to be executed in a search service to a software interface. The results can be the number of search results per component of the ontology, or the number of relations per component found pertinent to the query. These numbers, and their associated components, represent the statistics associated with the query. The system can then rank the components of the domain relevant to the query by using the statistics relevant to the domain. The system can then construct a new query that includes the original search service query and additional terms based on components selected from the system query, which can be arranged and formulated in user-defined or automated ways. The new query can then be transmitted to the search service, which may return a more focused set of results. Alternatively, the ontological system provides the components, which may be ranked and/or presented to the user as guides, which the user can then optionally use to refine the query in the existing search service.

The query-specific statistics can be used to design different strategies to enhance any of a multitude of information processes, for example, searching.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings

BRIEF DESCRIPTION OF THE DRAWINGS

FIG. 2 is a unit-interface displaying statistics extracted from an ontology in accordance with an aspect of the innovation.

FIG. 5 is an example user-interface showing the results of a search that has been enriched with data extracted from an ontology of one embodiment.

FIG. 8 illustrates templates of certain domain specific rules in accordance with aspects of the innovation.

FIG. 16 illustrates one embodiment of a correlation table showing the correlation between the concept instances of FIG. 15.

FIG. 21 illustrates an embodiment of a web page after a user has clicked on a particular concept shown in the web page of FIG. 20.

DETAILED DESCRIPTION

Figure 1:
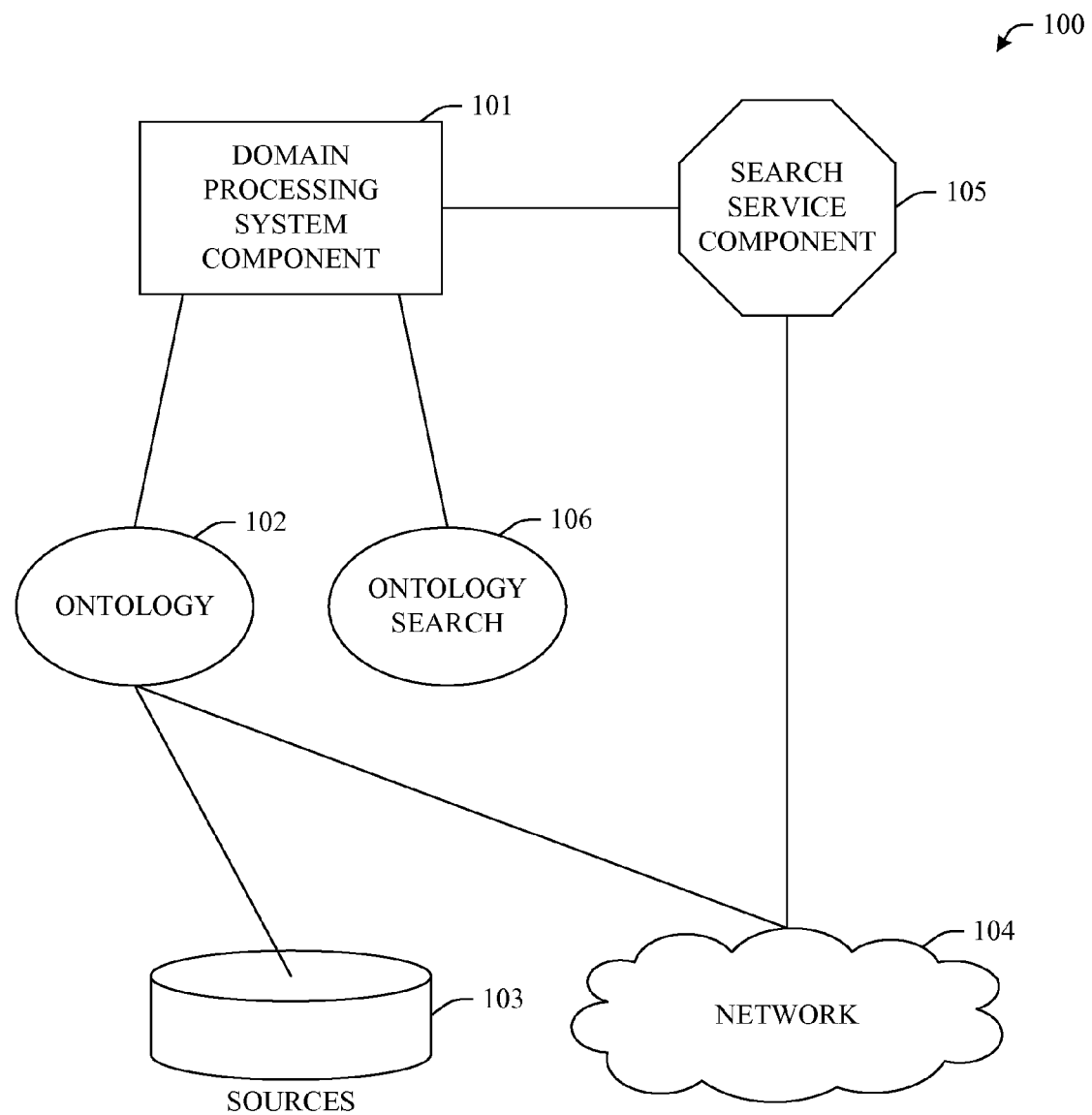
FIG. 1 is a simplified block diagram of a distributed computer network incorporating one embodiment of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

While certain ways of displaying information to users are shown and described with respect to certain figures as screenshots, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Referring initially to the drawings, FIG. 1 illustrates an ontological system 100 in accordance with one embodiment of the innovation. The ontological system 100 includes a domain processing system 101, an ontology 102, sources 103, a network 104 and a search service 105. The term "ontology" is a broad term intended to have its ordinary meaning. In one embodiment, an ontology is a data structure that contains models and associations and/or relationships between the models. In other embodiments, the models include concepts and relationships between the concepts. The ontological system 100 can be used, controlled, programmed, and/or interfaced with by one or more users. The term "user" is a broad term intended to have its ordinary meaning. In addition, the term "user" can mean a human operator or another system, which may in turn be operated by other systems or human users.

The domain processing system 101 works in conjunction with an ontology 102. The domain processing system 101 can access, in addition to the ontology 102, information from various data sources 103 including data sources accessed through a network 104, such as the Internet, and/or from a plurality of suitable networks. In one embodiment, the ontology 102 supports a search service 105 internal to or associated with the ontology 102 (e.g., an ontology search service 106), and therefore specialized to the domain of the ontology 102.

The term "domain" is a broad term intended to have its ordinary meaning. In addition, the term "domain" can include an area of expertise for the system or a collection of material, information, content and/or other resources related to a particular subject or subjects. For example, a domain can refer to financial, healthcare, advertising, commerce, medical and/or biomedical-specific information, among other types of information. It is to be understood that a domain can refer to information related to most any particular subject matter or a combination of selected subjects.

For example, in some embodiments, the ontology 102 models information or content relevant to a domain of interest or content of a particular class. Content can be most any searchable information, for example, information distributed over a computer-accessible network, such as the Internet. Content can generally be classified into essentially any of a number of content classes. Examples of content classes include, but are not limited to, travel destination information, financial information, healthcare information, advertising information, commerce information, pricing information, medical information, biomedical information, information about individual people, cultures, groups, sociological groups, market interest groups, institutions, universities, governments, teams, or other information group.

When the content is text-based, such as a document, an article, a scientific paper, a patent, a book, a magazine, a transcript, or any other text-based content, the content can generally be directly modeled by the ontology, as described in greater detail below. When the content is not primarily text-based, such as multimedia, music, songs, video, audio, podcast(s) or any other media, the content can be indirectly modeled by the ontology by modeling text-based information relevant to the content. For example, in some embodiments, media content such as audio and video can be modeled by modeling a transcript, closed-caption transcript, lyrics, summary, or any other text-based information related to the audio and/or video content. As well, in other aspects, conversion techniques such as speech to text conversion techniques can be employed.

The ontology 102 can be continuously updated by software agents that keep the information synchronized with the sources, adding information from the sources to the ontology 102 as models, attributes of models, or associations between models within the ontology. For example, in the biomedical domain, a new clinical trial for a specific therapy can be detected and the drugs identified in the clinical trial can be added as instances of models to the ontology. In the financial domain, for example, when a news release is issued on a company, the news release and company can be automatically detected and added to the ontology. The content of the data sources can be carefully selected to limit noise and ensure focus on a particular domain. A high quality of content in the data sources 103 allows for highly accurate subsequent analyses of external materials in reference to the ontology's content.

In one embodiment, an ontological system 100 includes an ontology 102 that models the concepts of a domain, the data sources and data source content that contain information or discourse specific to those concepts, and the relationships between the concepts and data sources and data source content. The term "concept" is a broad term intended to have its ordinary meaning. In addition, the term concept can mean an idea of or subject matter related to the ontology 102, such as, for example, a "drug" can be a concept within a healthcare ontology. The relationships between the models and the data source content are created in addition to, or independent of, the traditional ontological relationships to other concepts of the domain.

The term "model" is a broad term intended to have its ordinary meaning. In addition, the term model can mean the machine-readable representation of a concept that is modeled in the ontology 102, such as, for example, a drug model that exists in a healthcare ontology. A model can also include a data structure that has fields associated with the concept. For example, a model of a drug can include a data structure that includes fields associated with a drug trade name, a drug generic name, a list of diseases known to have been studied by using the drug, a list of publications that discuss the drug or include the drug name, patents related to the drug, etc. and most any other data structure field. In one embodiment, when an ontology is related to a particular concept, the ontology 102 also includes a corresponding model for that concept. In such cases, the model is used by the system.

The identification of relevant information to a model can be accomplished by any of a variety of methods, such as but not limited to, assignment by human editors, mapping of meta-tagging data, data-mining, or a broad or selective text search of the data source content using keywords based on the model. A system modeled in this manner can dynamically discover the relative strength of relationships between two concepts by determining the intersection of related data source content to the two concepts. This removes the task of defining relationships, a costly part of building a traditional ontology, as the number of potential relationships between concepts is exponentially larger than the number of concepts.

Data sources are sometimes part of the ontology, but in other embodiments, the data sources are not part of the ontology. For example, in some embodiments, the ontology communicates with the data sources over a network, such as the Internet. When the data sources are modeled as part of the ontology, the data source content can be model instances.

Figure 2:
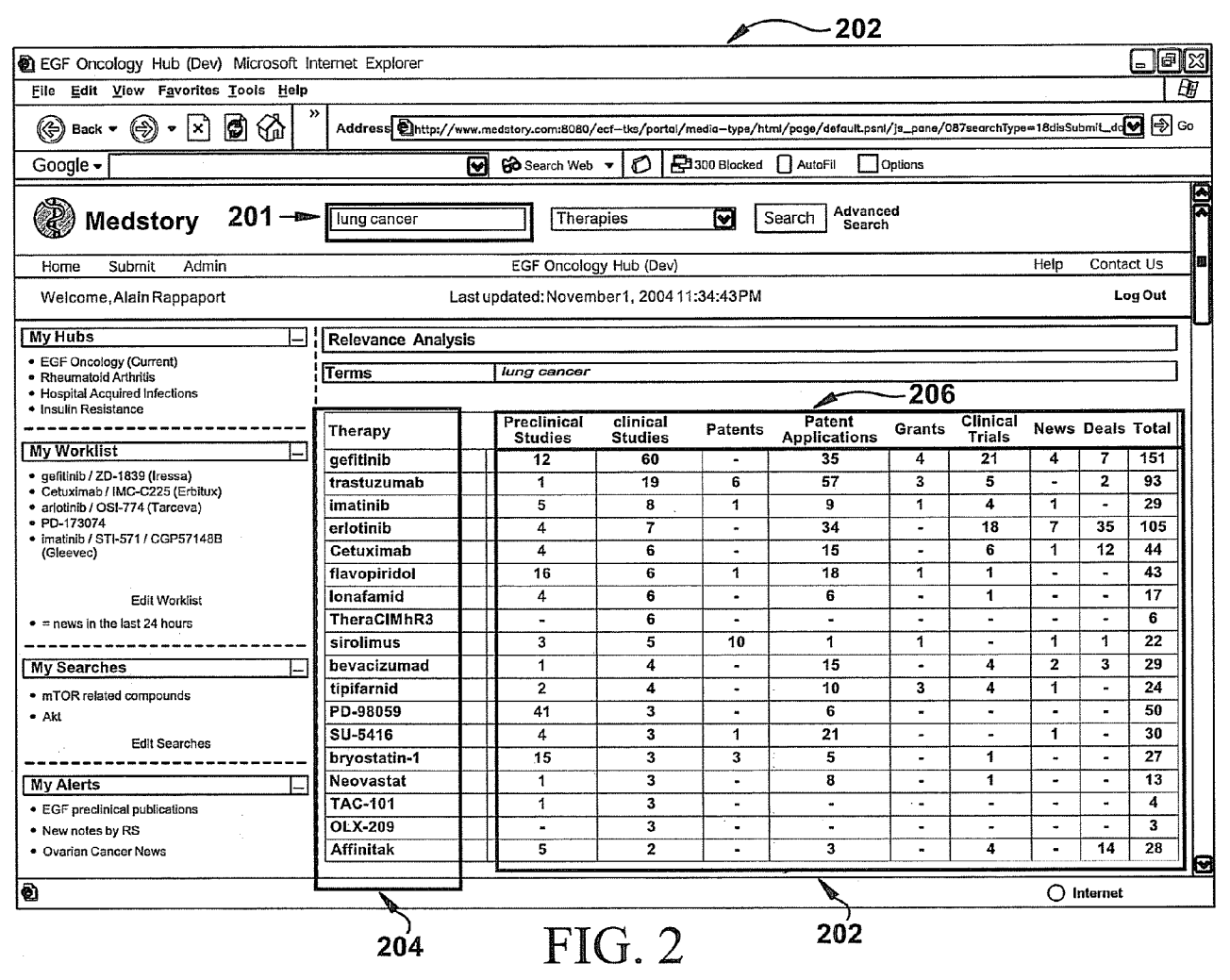

Turning now to FIG. 2, a web-interface 200 displaying the distribution by category or source of documents identified as relevant to a specific search 201 (in this case, the search query "Lung Cancer") in a biomedical ontology is shown. The numerical information 202 can be the number of data source items that are related (e.g., connected) to both therapies 204 and other categories of information 206. Each number and/or series of numbers 202 represent the "statistics" of the ontology component (e.g., drug in a biomedical ontology) associated with a specific information process, such as searching. It is to be appreciated that each number 202 can be associated with most any other information processes as well.

Any of a variety of methods can be utilized to determine the statistics of a particular search. For example, in one embodiment, the statistics include an indication of the relevance of a particular item of information or content within a domain to a particular search query. The relevance can be determined by a calculating a relevance score (rcq) for a concept c, given a query q, using i data sources items. In one embodiment, the relevance score ($r_{cq}$) can be expressed as:

$$r_{cq} = w(c) \sum_i [w(i) f(h_c, h_q)]$$

where:
w(c)=weighting function for the concept type, c
w(i)=weighting function for the data source item, i
$h_c$=set of items related to concept c
$h_q$=set of items related to query q The term "data source items" is a broad term intended to have its ordinary meaning. In addition, the term data source items can refer to individual entries or particular items of information in a data source, such as a news article in a news information database.

The data source items can be related to a concept using any of a variety of methods. For example, items can be related by manually creating a relationship (e.g., by meta-tagging the data source item with the concept name) or using an automated method, such as by automatically searching the data source items for concept names and creating the relationships based on the search results.

Similarly, the data source items can be related to a particular query by executing the query as a search against the data source items and considering the matching results to be related.

Any of a variety of normalized score functions, f(hc, hq), can be used as well. For example, the score could be represented by:

$$f(h_c, h_q) = (\text{similarity score})(z)$$

where:

$$z = |h_{cd_i} \cap h_{qd_i}|$$

$$\text{similarity score} = \frac{|h_{cd_i} \cap h_{qd_i}|}{|h_{cd_i} \cup h_{qd_i}|} = \frac{z}{|h_{qd_i}| + |h_{cd_i}| - z}$$

Thus, in one embodiment, the overall concept score reduces to:

$$r_{cq} = w(c) \sum_i w(i) \frac{z^2}{|h_q + h_c| - z}$$

By comparing the relative scores for concepts of one type (e.g., only comparing drugs), the weighting function of the concept type w(c) can be ignored, which further simplifies the method. Similarly, when using only a single data source, the weighting function of the data source item w(i) can be ignored.

Alternative similarity scores can further modify the method. For example, in cases where generally z and the set hqd1, is small for a given query compared to the number of items in the set of related data source items to the concept (hc), a simplified similarity score can be used:

$$\text{similarity score} = \frac{z}{h_c}$$

In one simple case, where:

$$f(h_c, h_q) = 1$$

the relevance score simplifies to:

$$r_{cq} = w(c) \sum_i w(i) z$$

When comparing two concepts to determine whether a relationship exists between the two concepts, $r_{cc}$, a similar algorithm can be used with i data sources:

$$r_{cc} = w(c_1, c_2) \sum_i w(i) f(h_{c_1}, h_{c_2})$$

where:
$w(c_i, c_2)$=weighting factor for the concept types of $c_1$ and $c_2$
w(i)=weighting factor for the data source item i
$h_{c1}$=set of data source items related to concept $c_1$
$h_{c2}$=set of data source items related to concept $c_2$ $$z = h_{c_1} \cap h_{c_2}$$

Any of a variety of functions can be used for f(hc1,hc2), as discussed above. Threshold values may be set to establish binary relationships (relationships that either exist or do not exist). These threshold values may be established by machine learning methods, or scores represent the strength of the relationship. Alternatively, scores may represent the strength of a relationship, or statistical methods such as a chi-squared analysis may be used.

The weighting functions, w(c1,c2), w(c), and w(i) can be established using any of a variety of methods, or combination of methods well known to those of skill in the art.

In one embodiment, the weighting function w(i), can vary not by individual data source item but by data source, with values established for each data type. Alternatively, the weighting function can depend on a data source item's properties, such as the item's recency, with more recent items receiving a higher weight or older items being given a weight of zero, thus excluding them from the relevance score.

One method of calculating or establishing weighting factors includes machine learning algorithms or methods (such as, but not limited to, supervised or unsupervised learning, etc.). Another method of establishing weighting factors can include manual adjustment depending, for example, on how important the source should be in determining the relevance scores. Importance can be determined based upon the identity of the user. For example, if the user is a researcher searching for biomedical research information, data source items such as articles can be classified as more important than other data source items, such as patents. In addition, a user can manually assign an importance to data sources.

In another embodiment, weighting factors are established according to a user's preferences. The preferences can be established directly by a user or they can be learned by monitoring the user's behavior. For example, if a user frequently reviews a particular data source type, that data source type can be assigned a stronger weighting factor. In another embodiment, weighting factors are established for different types of users. For example, one set of weighting factors can be assigned to a user of a healthcare system who is a healthcare professional (perhaps valuing clinical document sources more highly) and a different set of weighting factors for patients (perhaps valuing consumer-oriented information more highly).

After relevance scores have been determined for one or more concept types, the concepts deemed highly or more relevant can then be combined with the query to form a supplemented query. The supplemented query can then be used to query one or more data sources, as discussed in greater detail herein. Therefore, for any given ranking algorithm for a search engine, the ranking algorithm can be supplemented using the data about concepts relevant to a given query. For example, a search system or an ontological system can determine which concepts are relevant using, for example, any of the methods described above.

Thus, in one embodiment, the ontological system 100 can include:

1. concepts which can be explicitly modeled (e.g., an ontology with models representing entities);
2. data source content related to a domain; and/or
3. one or more tools to:
   a. automatically establish relationships between models and data sources;
   b. automatically establish relationships between models based on content of the data sources; and/or
   c. automatically establish relationships between external entities (nonmodeled or modeled in other ontologies) and models in the ontology, using the data sources.

In addition to automatically generating relationships, relationships can also be created manually or added into the ontology, and those relationships can also be used in making inferences or generating statistics, as will be described in greater detail below.

In one embodiment, the ontological system 100 uses an ontology based on a domain to enhance the search and analysis of documents in sources, for example, on the World-Wide Web and/or Internet as performed by traditional search engines, such as those that match text queries to text indices. This can include the domain processing system 101 working either in conjunction with a preexisting free-text or structured search service 105 using a specialized or customized free-text search service, or both as will be described in greater detail below. In one embodiment, more than one search service is used by the domain processing system 101 such that it can determine, which service to use and combine results according to domain- or user-specified rules. In one embodiment, structured search services (such as searching specific fields in documents), searching structured documents, may also be available.

Figure 3:
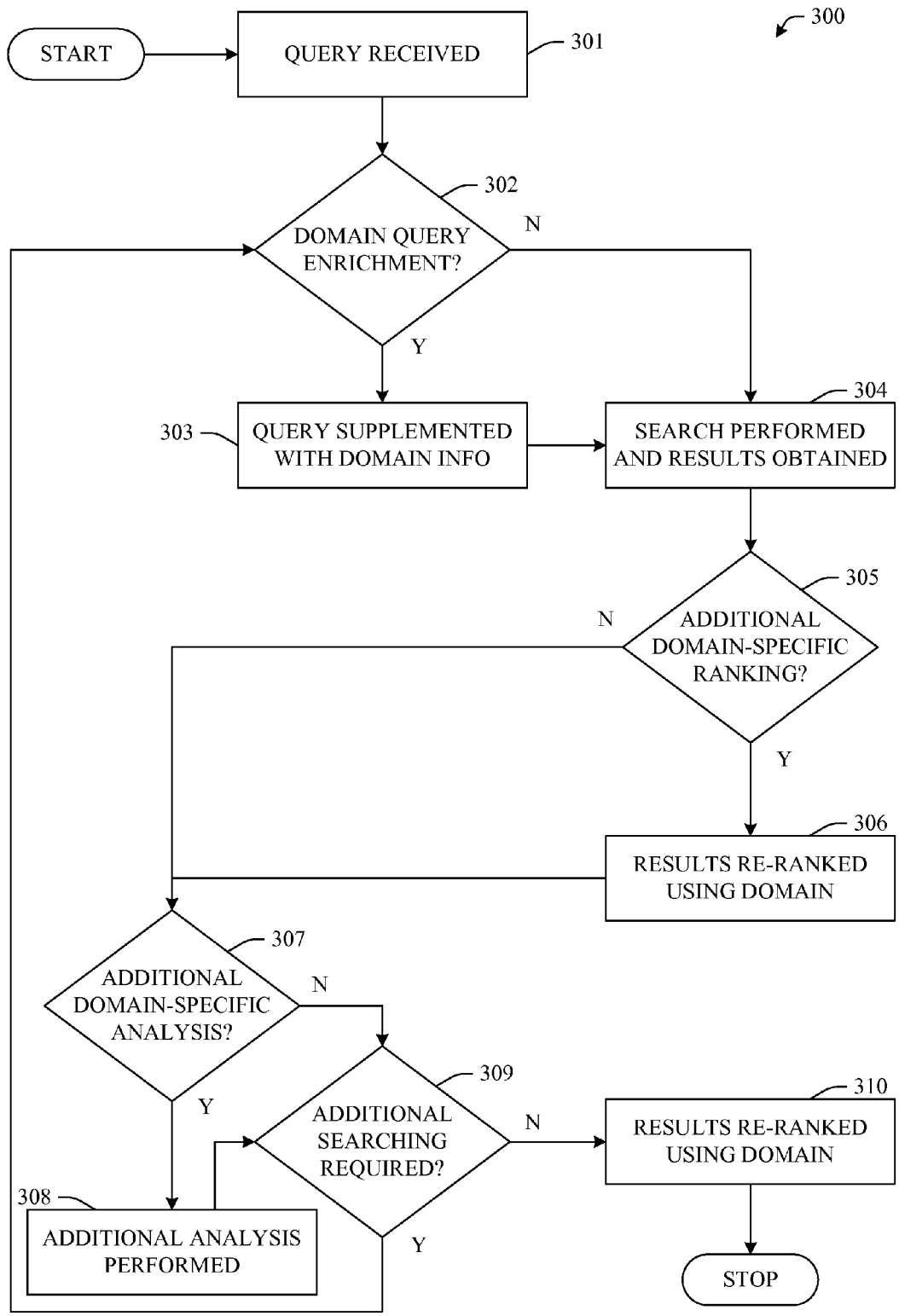
FIG. 3 is a simplified example flowchart of procedures showing the processing of a search request in accordance with one embodiment of the innovation.

Searching with a search service 105 can be enhanced with an ontology 102, as outlined FIG. 3. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation The method 300 can begin with a query being received from a user at act 301. A query can include words or phrases in a structured query syntax, unstructured text, or data in any format. After a query is received at act 301, the method 300 can determine if it is desired to perform a domain-specific enrichment of the query using the ontology at act 302. If enrichment is desired, the method 300 proceeds to act 303, where the query may be enriched according to user preferences or a user's role in the system. For example, if the domain is medical in context, the enrichment may vary if the user is a doctor, a scientist or a patient. Enrichment can also depend upon the query, the ontology, or other factors, including system settings.

The method 300 continues at step 304 where a search is performed. Search tools can be used at this act 304. The results are retrieved for processing (and/or optionally stored for later processing). The search tools can include, but are not limited, to web search tools, merchandise search tools (e.g., books, music, autos), specialized search tools (e.g., advertisements, images, videos), and domain search tools (e.g., medicine, finance, sports, travel).

At act 305, the method 300 determines if the results of the search are to be analyzed by the system and if additional domain-specific processing of the results is to be performed. Additional processing is performed at act 306 and can involve analyzing the results to re-rank or eliminate some items from the results that do not fit additional domain-specific criteria. Alternatively, at act 306, the method 300 can boost the ranking of items that more closely match domain-specific criteria as extracted from the ontology, such as increasing the score of items that also match a high number of related models related to the query. For example, in the medical domain, ranking a scientific paper that discusses several drugs relevant to the query higher than a paper that only discusses one drug relevant to the query.

The method 300 then determines if additional domain-specific analysis are to be performed on the search results or the query itself at act 307. Additional analysis may be performed on either the query or the result set at act 308. For example, in one embodiment, the method 300 determines how the search results are connected to items in the ontology. At act 309, the method 300 then determines if the additional analysis requests additional searches to either refine the search or extract further information. If additional searching is requested, the method 300 returns to act 302 as illustrated.

A single-pass analysis of results may be sufficient in some cases, in which case the method 300 continues to act 310. Alternatively, the cycle of querying and analysis can continue or repeat until a steady-state of results is obtained, or until a predetermined state is reached. Eventually the final result set and/or the analytic results are assembled and returned to the user or saved by the system at act 310.

Figure 4:
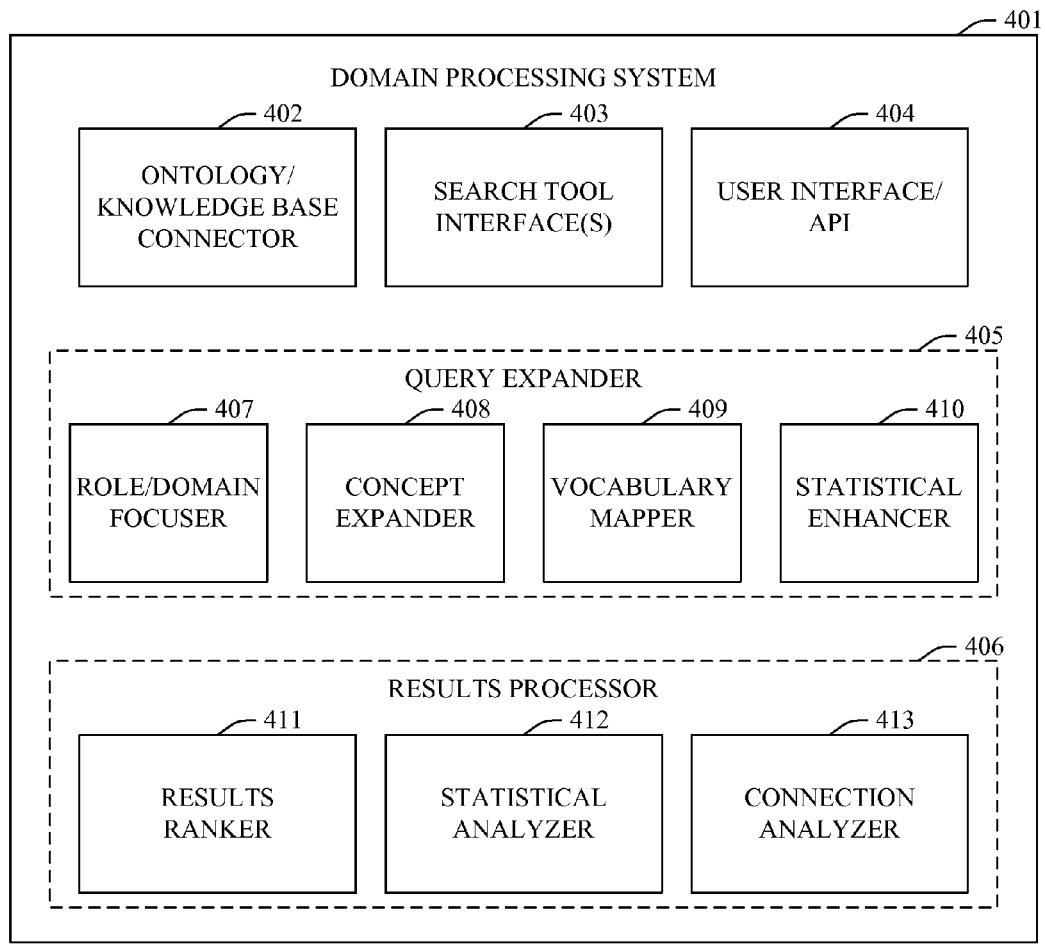
FIG. 4 is a simplified block diagram showing some components of the domain processing system in accordance with an aspect.

One embodiment of a domain processing system is shown FIG. 4. In this illustrated embodiment, the domain processing system 401 can include an ontology/knowledge base connector 402, one or more search tool interfaces 403, a user interface and/or API 404, a query expander component 405 and a results processor 406.

In one embodiment, an ontology connector 402 connects to and extracts information from the ontology (102 of FIG. 1). Other components can use this component to access domain information or other information stored in the ontology. In addition, one or more search tool interfaces 403 is available for the domain processing system 401 to invoke one or more search tools to perform free text queries or other searches.

In one embodiment, a query expander 405 modifies an input query in a domain-specific manner using information from the ontology connector 402. The query expander 405 can have subcomponents responsible for particular analysis and modification of the input query as described below.

In one embodiment, a role/domain focuser 407 of the query expander 405, adds to the query or otherwise modifies the query depending upon the role of the user or to otherwise increase the quality of the result set. For example, in the healthcare space, if the user is a patient looking at treatment options, the focuser component 407 uses statistics to append the names of all of the drugs and other treatments to the query as an ORed string. The names of all the drugs might further be expanded (by concept expander 408) in ORed fashion to include all synonyms, trade names, generic names, project names, etc. This can include the use of a vocabulary mapper 409 in this process. For example, if a user provides a query for a medical treatment "x," the role/domain focuser 407 can supplement the query with the names of drugs "y" and therapies or treatments "z" that are known by the system to be treatment options to "x." The resulting query in this case may then be the initial query appended with the string:

x AND (y OR z OR . . . )

where x, y, and z represent treatment names in the ontology.

In another example, the focuser component 407 may be attached to an ontology about European Football. In this case, the focuser may append the following string to the search input by the user:

"European football" OR soccer

Figure 5:
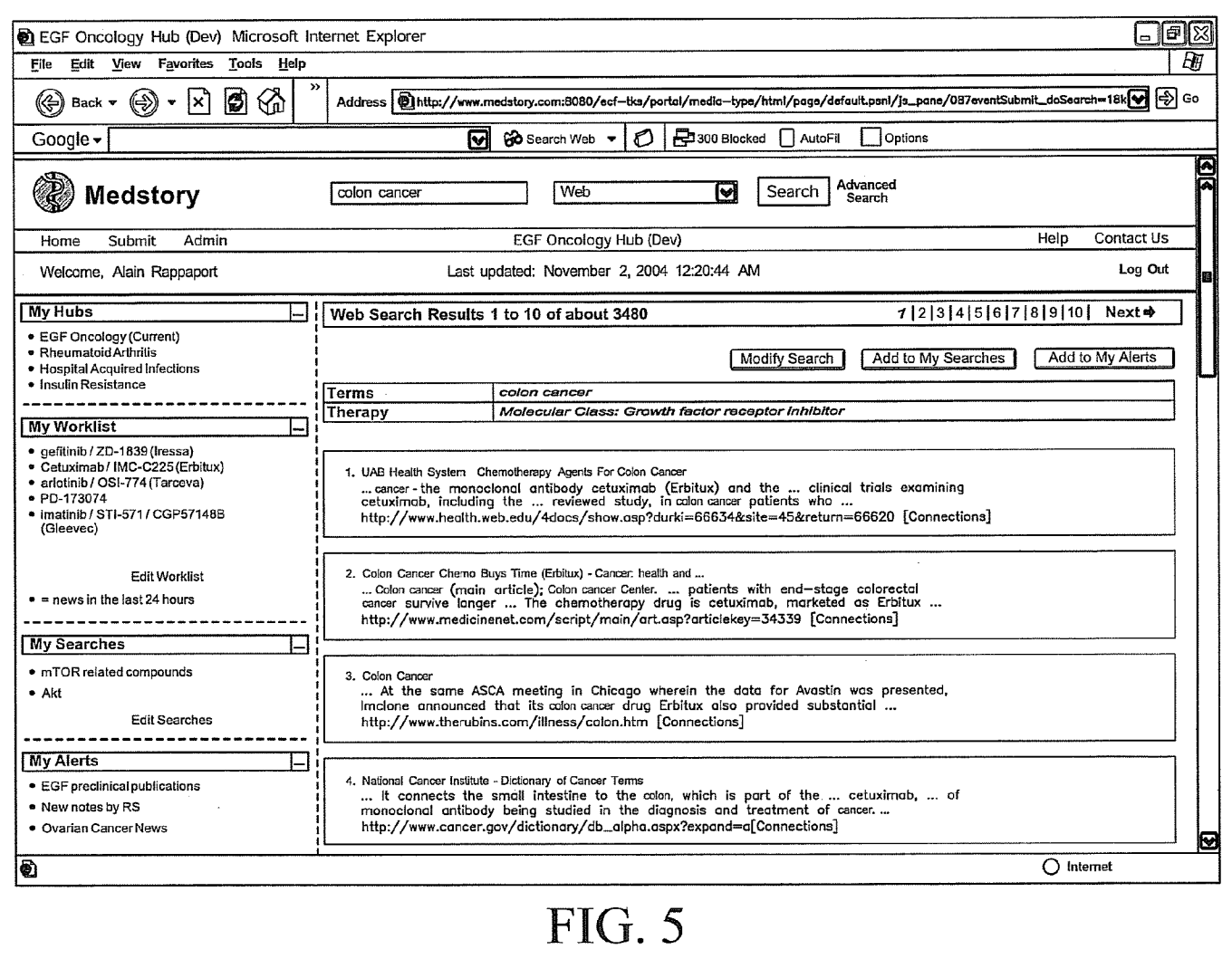

In one embodiment, a concept expander 408 component expands a query based on related concepts in the domain to include matches that indirectly fit the query criteria. For example, a user interface may allow in a biomedical domain that a molecular class of a compound be specified in a search. Rather than do a free text search on just the name of the class, which is likely not standardized in any free text repository, the query may be expanded to include names of compounds that are known in the ontology to be of that molecular class. One embodiment of a user-interface showing results of a search that allows the user to refine a query based on data extracted from an ontology is illustrated in FIG. 5.

Referring back to FIG. 4, in one embodiment, the vocabulary mapper 409 uses the domain ontology/knowledge base to map common terms to synonyms. For example, a user's query involving a generic name of the drug may involve searching the ontology to find and inject any project or commercial names of the drug into the query.

In one embodiment, a statistical enhancer 410 targets the result sets of a query to the most pertinent, domain-centric results by injecting statistically significant terms based on frequency analysis or co-occurring keywords from the ontology. For example, a search with the term "treatment" in the domain of ovarian cancer may append the top occurring treatment names as determined using content within the ontology using the statistics.

Figure 6A:
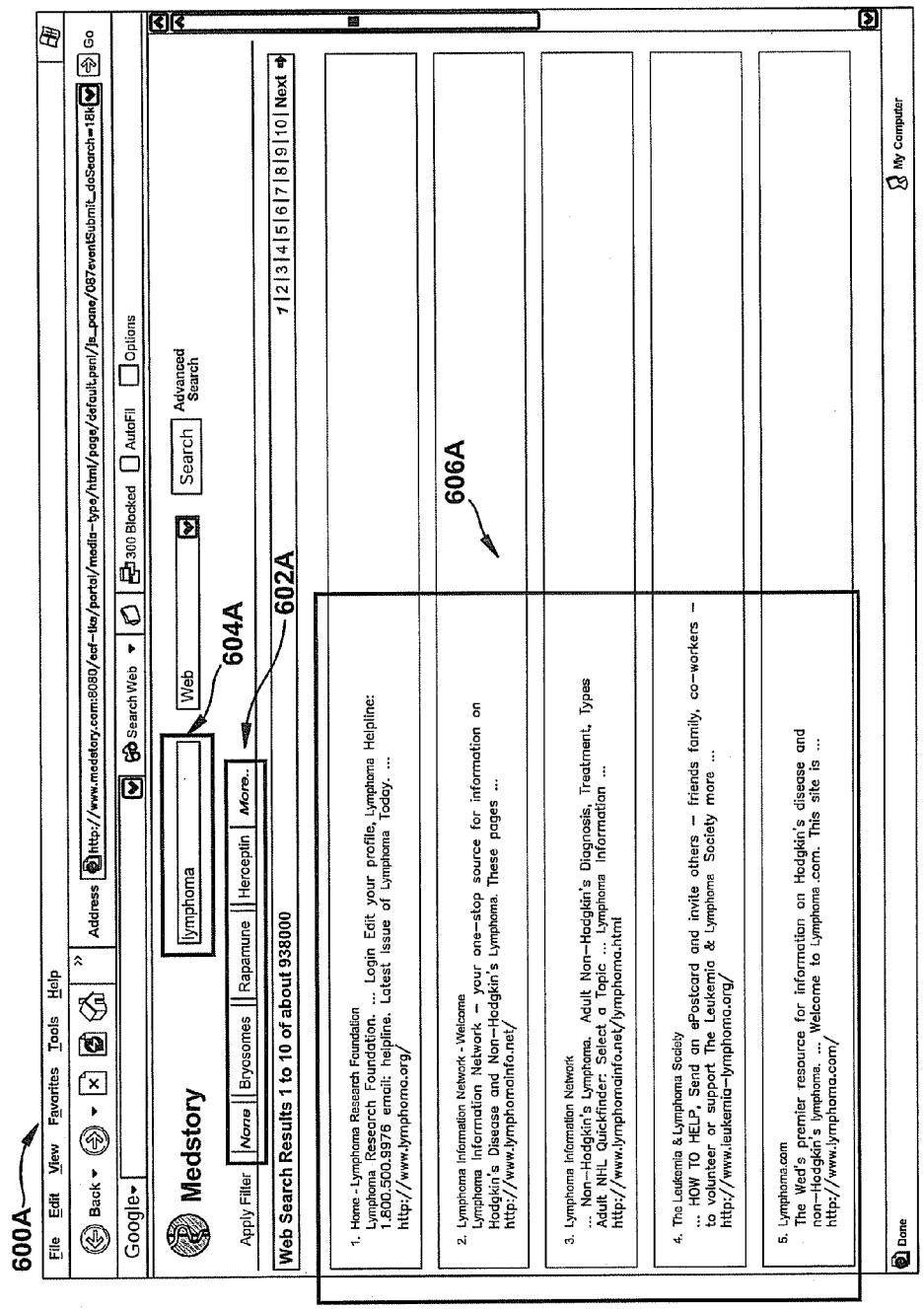
FIGS. 6A-6C are user interfaces showing search results, which allow the user to refine or focus a query based on data extracted from an ontology.
Figure 6B:
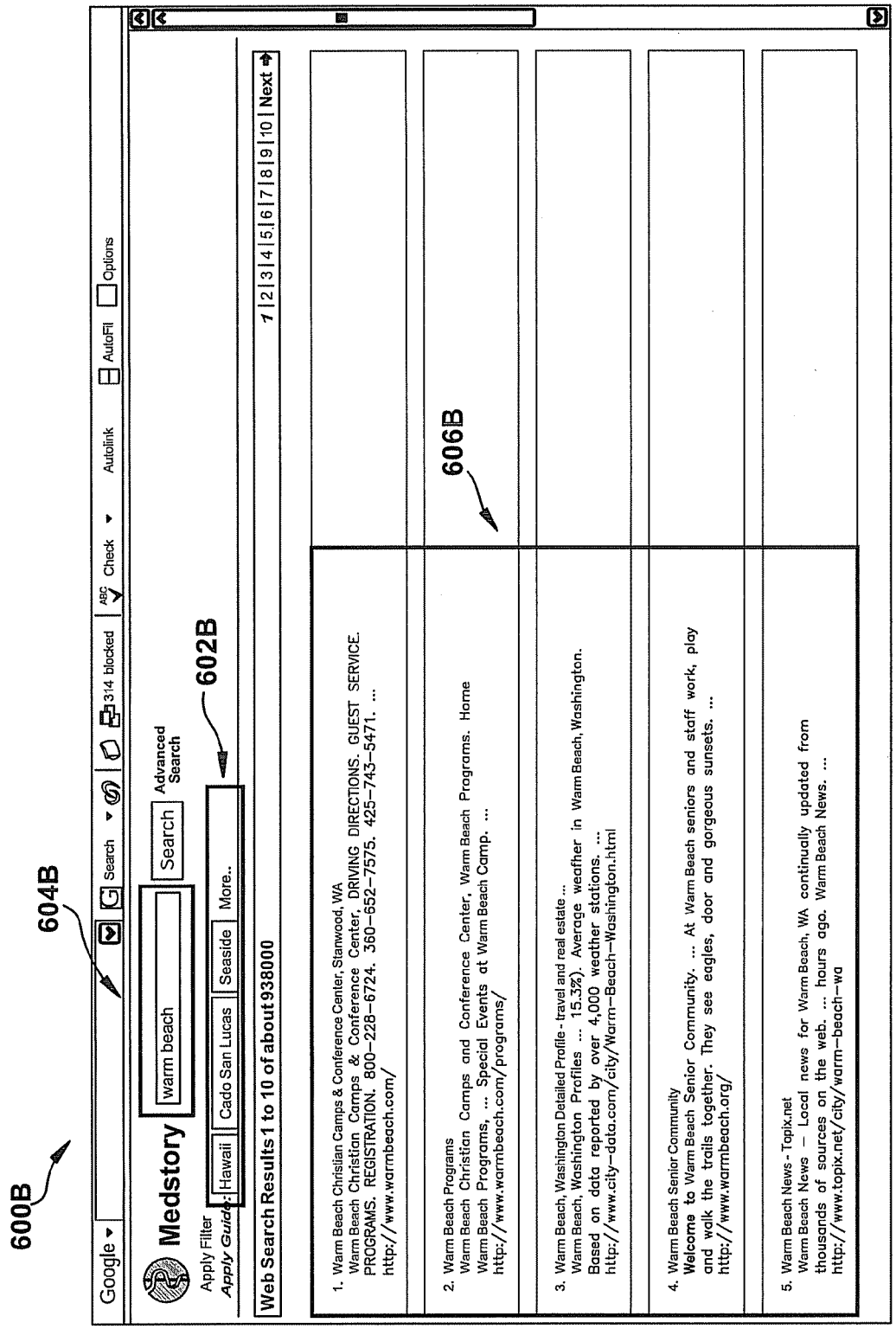
Figure 6C:
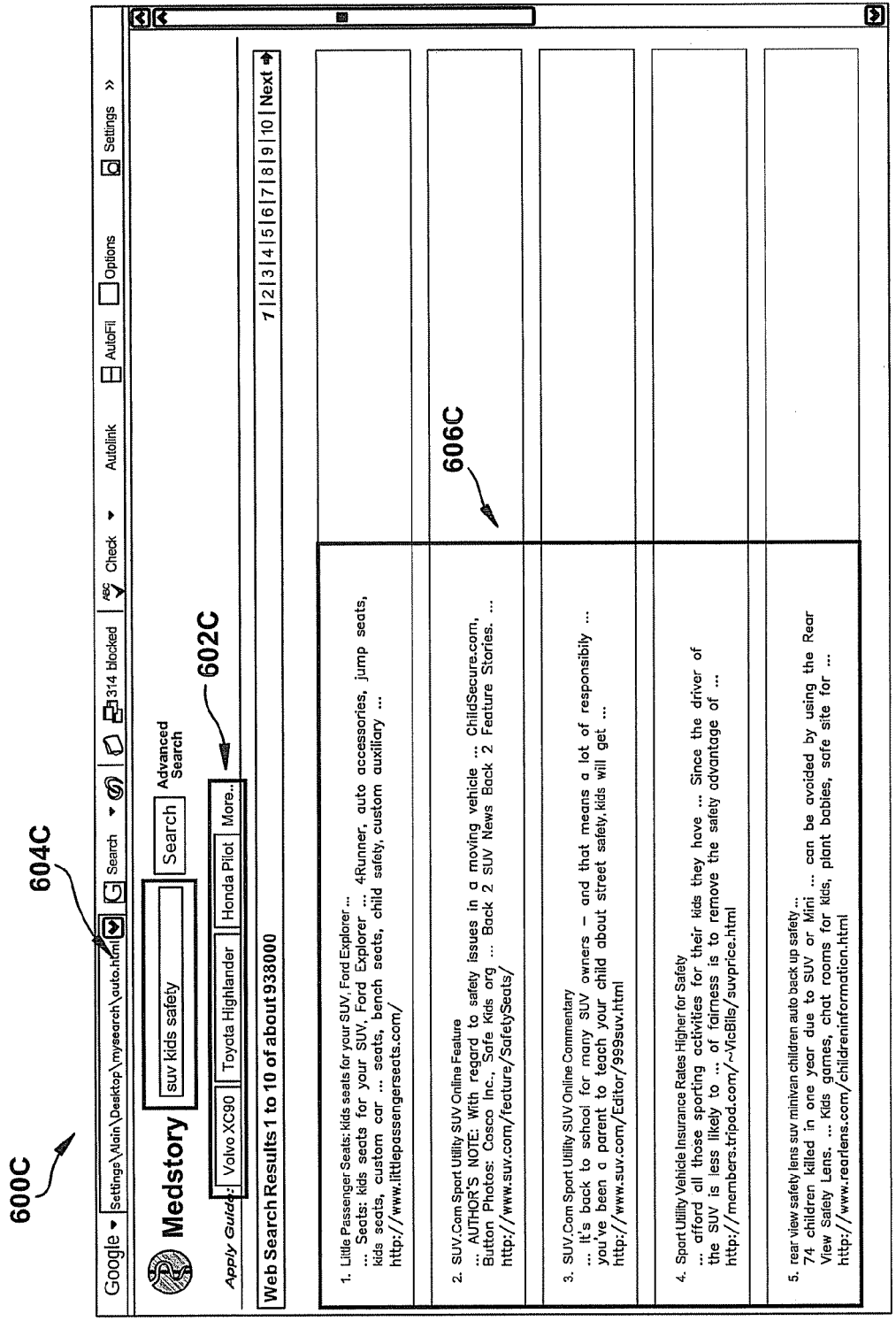

In one embodiment, the query originally designed for another search service is executed in the ontology. The ontology search generates a number of results on which statistics are calculated to identify, for example, the top three treatments relevant to the query. These treatments may, for example, then be added to the original query to increase its focus, or, for example, will be presented as guiding terms (as shown in FIGS. 6A-6C) that can be added to the query to enhance the quality of the results. The statistically or numerically derived new terms allow the search to be focused, increasing specificity and chance/probability of identifying relevant information. In one embodiment, the relevant concepts may be presented to the user such that they can choose to refine their search with the relevant concepts.

For example, as illustrated in FIG. 6A, the user in a biomedical hub or domain is presented with a user interface 600A that includes therapies 602A that most strongly correlate to the query 604A according to a search of the content within the ontology. The therapies 602A identified by the system utilizing the user interface 600A are not only useful data; in addition, the user can then use or select one or more of the therapies 602A to refine the query 604A and focus or direct the search results 606A to more relevant information. Focused searching can be other domains as well.

FIG. 6B illustrates a user interface 600B presented to a user in a domain related to automobiles. The user interface 600B includes guides or filters 602B that have been identified by an ontology as relevant and/or correlated to the user's search query 604B. The filters 602B provide the user with additional informational categories relevant to search query 604B. The user can select one or more of the filters 602B to refine the query 604B and focus or direct the search results 606B to more relevant or desired information.

Similarly, FIG. 6C illustrates a user interface 600C presented to a user in a domain related to travel information. The user interface 600C includes guides or filters 602C that have been identified by an ontology as relevant and/or correlated to the user's search query 604C. The filters 602C provide the user with additional informational categories relevant to search query 604C. The user can select one or more of the filters 602C to refine the query 604C and focus or direct the search results 606C to more relevant or desired information.

Referring again to FIG. 4, a results processor 406, in one embodiment, processes the response of the search request from the search tool(s). In one embodiment, the results processor 406 processes results to further refine queries before returning the results to the user, or it may simply process the results for analysis. The results processor 406 can include various sub-components, such as a results ranker 411, a statistical analyzer 412, and/or a connection analyzer 413 as described below.

In one embodiment, a results ranker 411 reorders results from the search(es) if applicable. This act may be optional, as a search tool may have already provided this service or may use an ordering sufficient for the user. If more than one search tool is used, the results may be merged according to the user's preferences or ranking algorithms determined using the ontology by the results ranker 411. The results ranker 411 can, for example, rank documents in a healthcare domain based partially on the number of compounds in the ontology that the document mentions and their query statistics (e.g., statistics generated by executing the query in the ontology). The search results may not contain sufficient information about the result set returned for an adequate ranking, in which case the ranker 411 retrieves required information either by retrieving the document itself, a cached version of the document from the search service, or may retrieve the information required by other suitable means.

In one embodiment, a statistical analyzer 412 performs statistics on the result set and/or the ontology to return to the user or record in the system. An example of the analysis may involve a calculation of the number of items internal to the ontology with matches to the query as well as similarity or comparison analyses between the result set and items internal to the ontology. In one embodiment, the results ranker 411 may use the statistical analyzer 412 in the process of re-ranking or modifying the result set.

In one embodiment, a connection analyzer 413 analyzes the returned result set to link the result set to concepts or items in the ontology so that the user can easily navigate to those items or visualize the concepts involved. This function may further allow the user to correlate items with search results. For example, a search on advanced stage ovarian cancer may correlate highly with certain experimental compounds which the user may wish to further investigate. In addition, this function may allow the user to easily refine their search by integrating connected concepts into their subsequent queries.

Figure 7:
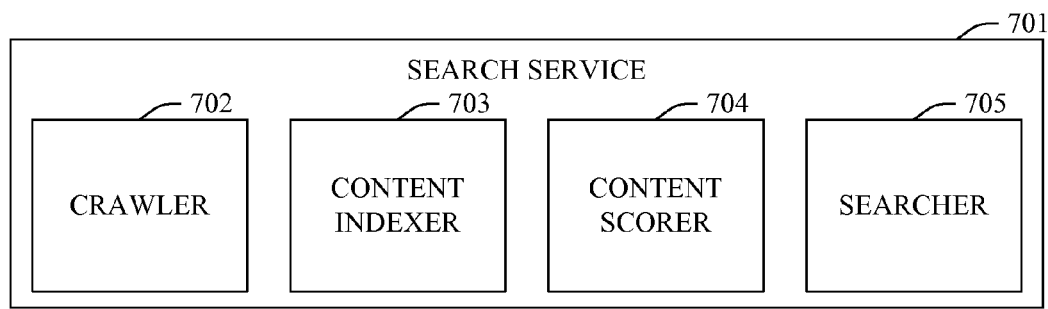
FIG. 7 is a simplified block diagram showing components of the search processing component of an aspect of the innovation.

The search tool components can include externally available, general search engines or alternatively, in one embodiment, can be a domain-specialized search engine, as shown in FIG. 7. In one embodiment, the search service 701 is integrated with the domain processing system 401 such that the search components have available the analysis and ontology access components. Alternatively, the search service 701 can directly access the ontology.

In one embodiment, a crawler 702 determines a subset of the web or other data sources appropriate for indexing based upon the ontology. The content indexer 703 may also selectively index documents by analyzing them according to domain inclusion criteria. The content indexer 703 can also create domain-specific indexes according to the knowledgebase or ontology. For example, the indexer can create an index in a biomedical domain for compounds that appear in the document.

In one embodiment, the content scorer 704 may use a scoring algorithm that is dependent upon the domain. For example, in a biomedical domain, a higher score may be given to documents that refer to more compounds. The searcher component 705 can also be customized to search domain-dependant indexes in accordance with the content indexer.

In one embodiment, domain processing system 401 can use a templating system to describe rules for domain focusing, vocabulary mapping and concept relaxation, as described below. The templates or selectors, created for an object-orientated ontology, allow for the description of what properties in the ontology are related to other properties in the ontology. Such templating systems allow the description of these rules on a per-user basis, and are extensible for allowing different users and/or user roles that incorporate new rules for processing queries.

For domain focusing, the template can be used to unambiguously describe properties that are to be added to a query to focus search results. For example, FIG. 8 illustrates embodiments of templates 801, 802, 803 used in a biomedical domain application. In one embodiment, a compound template 801 indicates that all compound names (e.g., the compound's generic, project and commercial names) be used in the focusing query.

For vocabulary mapping, the templates can define what properties are equivalent and should be appended to any matching terms. For example, in a biomedical domain, a compound template 802 could indicate that all compound names be expanded.

Concept relaxation can also be described by templates, which can define what properties should be added into a query. For example, in a biomedical domain, a query on a compound's mechanism of action could be supplemented by adding the compound names to the query by using a template 803.

Templates can be used to focus information in any domain, including those outside of biomedical domains. In addition, the templates can specify rules for processing statistics generated to determine relevant content.

Referring again to FIG. 4, the domain processing system 401 can act as a conduit to search content sources outside of the ontology, and it can also act as a source of information to incorporate to the ontology. The documents returned from searches can be analyzed in conjunction with pre-existing or seeded data to incorporate the new content into the ontology. For example, in a biomedical or domain, news articles found to be connected to compounds could be added as additional information to the ontology itself. In another embodiment in the biomedical domain, new companies or compounds could be detected using queries assembled from the seeded database.

An example illustrating many aspects of the system may be useful. While the system could be used in conjunction with most any search-based service, the following example uses this system with a book search engine to create a more powerful book search platform.

Such a platform could have several parts including a database of books that might contain the title and author of each book, an algorithm for matching a user's query to books that are relevant, and an algorithm for ordering the matching books by their degree of relevance. If a user submits a query to this platform for "Michael Jordan," a reasonable result may be a list of books with the phrase "Michael Jordan" in the title or written by the author "Michael Jordan." These books could be ordered by some measure of relevance, possibly by the number of sales or by the latest publication date. Similarly, if a user submits a query to this platform for "slam dunk," a reasonable result may be a list of books with the phrase "slam dunk" in the title, ordered by some measure of relevance.

An ontology system built according to this innovation could assist such a platform with any or all of these parts in a knowledge domain. Multiple ontology systems could assist such a platform in several knowledge domains. Continuing with the example in the sports domain, a book search platform could use the concepts modeled in the sports ontology system to tag books in its database so that books that do not have the phrase "Michael Jordan' in the title would still be associated with the model of "Michael Jordan." Now when a user searches for "Michael Jordan" they will receive more results because the ontology system has assisted the search platform in finding relevant results.

A book search platform could also incorporate the sports ontology system to assist its algorithm for matching a user's query to books that are relevant. First, the sports ontology system could provide one or more additional queries based on the concepts in the ontology. These queries could include but are not limited to words or phrases. If a user submits a query to the platform for "Michael Jordan," the system might return an additional query for "Air Jordan' because the phrase is described as a nickname in the model for "Michael Jordan." In this case, the book entries themselves do not need to be tagged with meta-tags or keywords. In addition, the sports ontology system could provide one or more additional queries based on relationships in the ontology. If a user submits a query for "slam dunk," the system might return the following two additional queries: "Basketball" and "Hoops." "Basketball" may be returned because the system discovered a correlation between "slam dunk" and the model of "Basketball" and "Hoops" may be returned because the word is described as a slang term for the model of "Basketball."

A book search platform could also incorporate the sports ontology system to assist its algorithm for ordering the matching books by their degree of relevance. First, if different subsets of results were retrieved based on additional queries generated by the system, the ordering of these queries by their degree of correlation could be used as part of the ordering algorithm for the books. Second, the titles and authors or each matching book could be analyzed by the sports ontology system for their correlation to any concepts in the ontology and scored. The books would then be ordered according to their relative scores.

Figure 9:
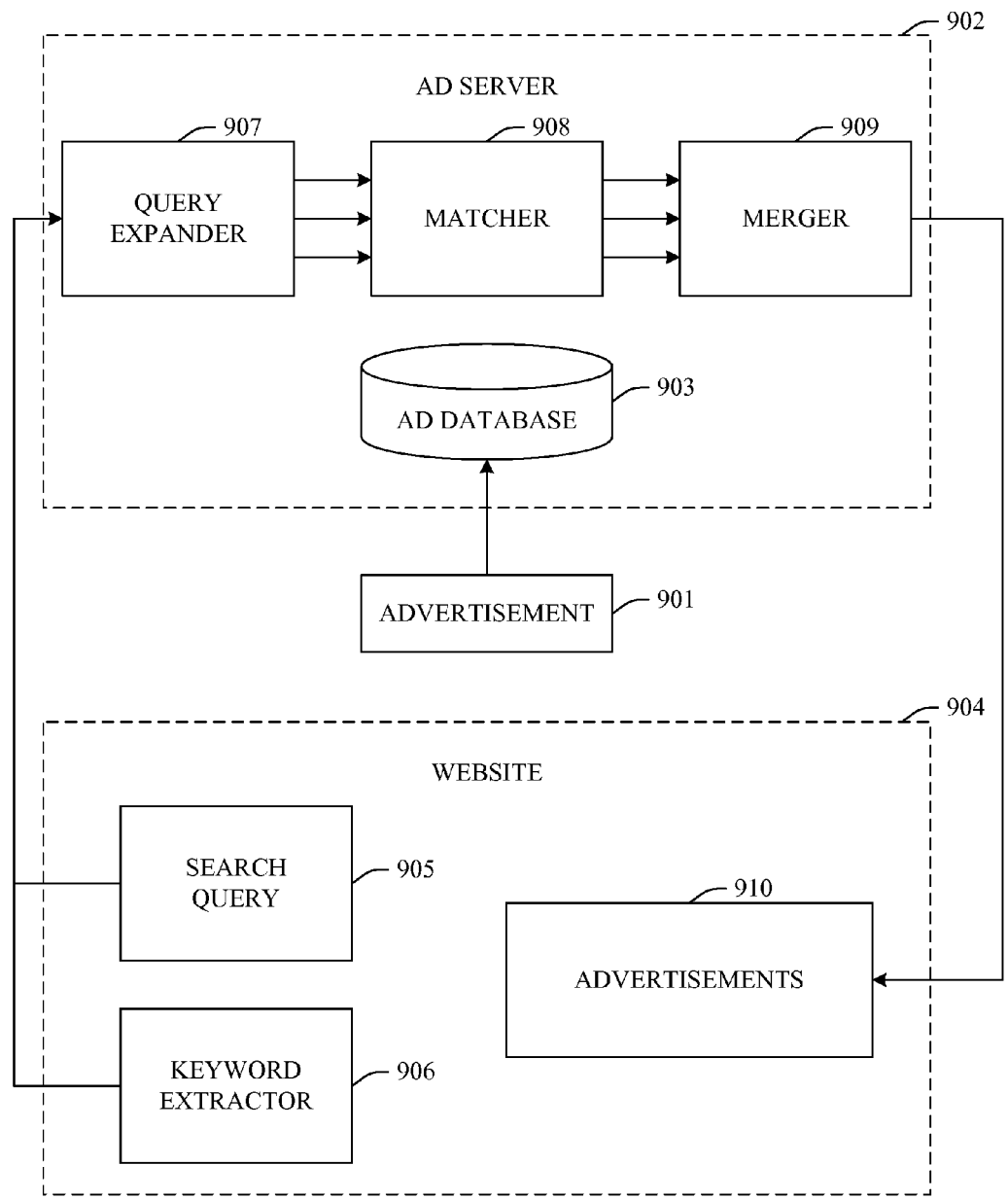
FIG. 9 is a block diagram of an example online advertising system that uses an ontological processing system to determine targeted advertisements to display to end-users.

The uncovering of concepts using the system may also be used to improve online advertising systems. An example of an online advertising system is shown FIG. 9. In this embodiment, an advertiser can submit an advertisement or advertisement campaign 901 to the ad server 902 which then gets stored in an ad database 903. The advertiser may enroll the advertisement(s) 901 using either traditional characteristics such as certain sites, or a category of sites that have been categorized by the advertising system, certain keywords, certain profiled user information, etc. However, the advertiser could also, in addition to such traditional approaches, enroll the campaign into general concepts related to that given domain.

For example, in a medical context, the advertiser might choose to have an advertisement 901 displayed for all queries that are related to a given drug or condition. The ad server 902 can then use statistical enhancer 410 (with an ontology linked to domain content sources) to determine when a relative query, user profile, and/or page or site content match a given concept that has been subscribed to by the advertiser.

In one embodiment, the system can assist an advertiser in choosing to display advertisements on specific websites or specific web pages, which may be part of an advertising network. In one scenario, the sites or pages could be found using a query using a search system previously described that searches the sites available in an advertising network or other index, including search results from a search engine. This may or may not include, for example, the ability to refine the search according to certain concepts as uncovered by the statistical enhancer 410 for the advertiser's supplied search query and/or other advertiser supplied information (e.g., advertiser's name, type of product being advertised, intended demographic of audience, etc.).

A website 904 using an advertising engine may request advertisements using various techniques to query the ad server for an appropriate set of advertisements to display. In one approach to online advertising, typical of search websites, a user's search query 905 is sent to the ad server 902 to retrieve advertisements. In another type of advertising approach, usually for web pages that have content that is not shown in response to a user query, the ad server can use keywords 906 extracted from the content of the page to determine appropriate content. This process to determine a key set of words for a given site or content may be done as part of the advertising engine's services.

In one embodiment, regardless of whether a query to the advertisement server is generated by a user or in context to a given page's content, a query containing these keywords is passed to the ad server 902 which then processes the query with the query expander 907. The query expander 907 can do any or all of the following:

a) use the statistical enhancer 410 to determine the most relative concepts that are related to the query or keywords;

b) determine if any items in the query represent concepts in the ontology and if so, can determine domain-specific ways to improve the query, make the query more comprehensive, or add additional queries that are related to the original query that should also be performed; and/or c) determine if any concepts related to the query (as determined by the statistical enhancer 410) represent concepts in the ontology that should also be used in domain-specific ways to improve the query, either by modifying it or by introducing additional queries that are related to the original query that should also be performed.

As an example, if in the medical domain a website search engine submits the following query to the advertising system:
    herceptin treatment
the query can be provided to a query expander 907 which can output the following set of queries:
    (herceptin OR trastuzumab) treatment
    breast cancer herceptin treatment
    (herceptin OR trastuzumab) "clinical trials"

In this example, the first term (herceptin) has been recognized as a drug and in the first query, using domain knowledge in the ontology, the term has been expanded to include the drug's generic name (trastuzumab). In the second query output, the drug has been recognized as associated with breast cancer, and the term breast cancer has been added to the query. In the last query, it has been recognized that any clinical trials may also be appropriate for or relevant to this query set.

These queries could also be represented as a single query with the different clauses separated by the logical OR operator, for example:
    ((herceptin OR trastuzumab) treatment) OR (herceptin genentech treatment) OR (breast cancer herceptin treatment) OR (herceptin clinical trials)

The queries output from the query expander 907 may not specify only keywords that the advertiser has subscribed to, but also concepts that the advertiser has subscribed to and the degree of expansion that was done to arrive at those concepts (e.g., the original query from the website may have referred to a concept directly or alternatively, the concept may have been added because it was deemed highly relevant). This approach is useful when the advertiser is allowed to specify concepts, in addition to keywords, that they wish to target. A representation of one query generated from "herceptin treatment" with this information is shown below: indication:
    breast cancer(1) drug:herceptin(0) keywords:treatment(0)

This specifies that an indication was found highly correlated to the query and that the query itself included a concept as well as a keyword, which in this example, may not have been recognized by the statistical enhancer 410 as a concept. Under this notation, (0) represents a direct match and (1) indicates a related concept. Less closely associated concepts may also be indicated with higher (x) values. In an alternative embodiment, the output may provide a score as established by the statistical enhancer 410, indicating how strong a concept is associated to a query, or an ordering/ranking of the related concepts based on their scores.

A matcher 908 processes the query or queries that are output from the query expander 907 and finds advertisements that match that set of queries. Depending upon the algorithm used and/or the requirements of the advertiser (who may be able to specify which requirements must be met), this process may require exact matches or may find advertisements that only partially match the input queries. The matcher 908 returns a set of advertisements, or if more than one query is given to the matcher 908, it may return multiple sets of advertisements, which then are sent to the merger 909 for processing.

The merger 909 receives one or more sets of advertisements that match the query or queries generated by the query expander 907. The merger 909 can use one of several methods to consolidate the sets of advertisements into one ranked list of advertisements to send back to the service caller, or can use a combination of methods. These methods include, among others:

a) Using metrics or a combination of metrics associated with the purchase and display of one or more advertisements and the response of one or more users to the viewing of these advertisements. Such metrics include but are not limited to the cost per impression (CPM), cost per click (CPC), and cost per action (CPA) as well as the click-through count and the click-through rate (CTR).

b) comparing the strength of the match between ads and the set of queries, such as the number of keywords that the advertising campaign matches as a fraction of the number of keywords of the query.

c) using domain knowledge to order the advertisements according to the query that the advertisement matches, or the number of queries the advertisement matches. For example, a query produced that has clinical trials in the query may be considered more valuable than one that does not have clinical trials.

d) ranking the advertisements by comparing the owner, the content of the advertisement, and/or the content of the advertisement's destination with the concepts extracted from the relevance analysis of the original query entered into the system.

e) Any combination or sub-combination of approaches described above.

In one embodiment, the click-through rates for advertisements are captured and can be used to adjust the strength of certain relationships in the ontology or for use in the ranking algorithm of the merger 909. For example, if a query is found to be associated with a certain drug which is then included to find advertisements and those advertisements are not clicked on sufficiently, the association between that query, or the concepts related to that query, and the drug may be weaker than proposed by the statistical enhancer 410. In one implementation, the click-through data is captured and used in the calculation of the relative relationship strengths. In another embodiment, the merger 909 adjusts relative rankings based on this data.

Figure 10:
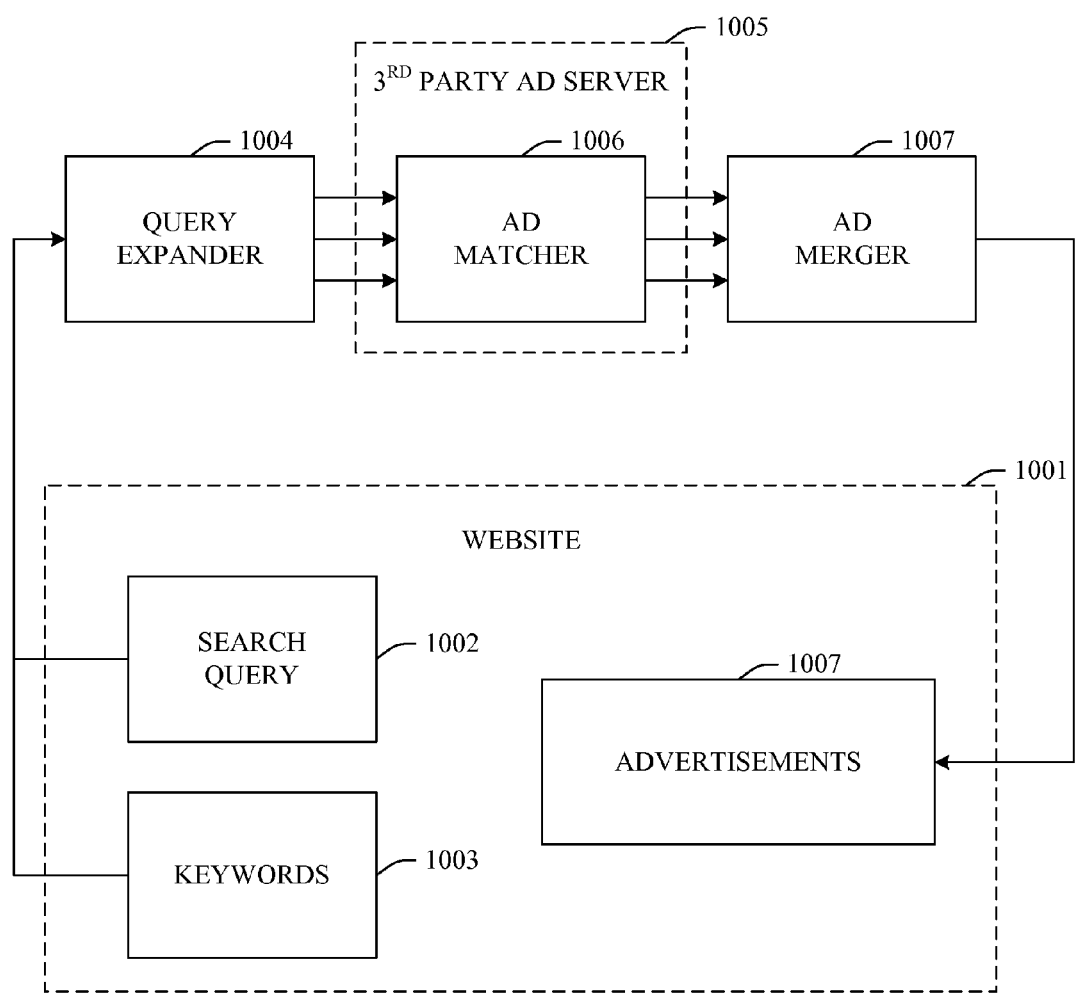
FIG. 10 is an embodiment of an ontological processing system integrated into an existing online advertising system.

In one embodiment, as shown FIG. 10, a concept-based advertising process is incorporated with a third party's ad server system 1005 by having a query expander 1004 intercept queries from the website 1001, generate one or more queries to the ad server 1005 using the keyword expansion discussed above. In this scenario, if the advertiser is not allowed to subscribe to concepts but only keywords, the query expander 1004 outputs keywords as queries and not concepts. The ad server 1005 returns one or more sets of advertisements, one for each query generated by the query expander 1004, which is then used by a merger 1007 to produce a consolidated, ranked list of advertisements.

Figure 11A:
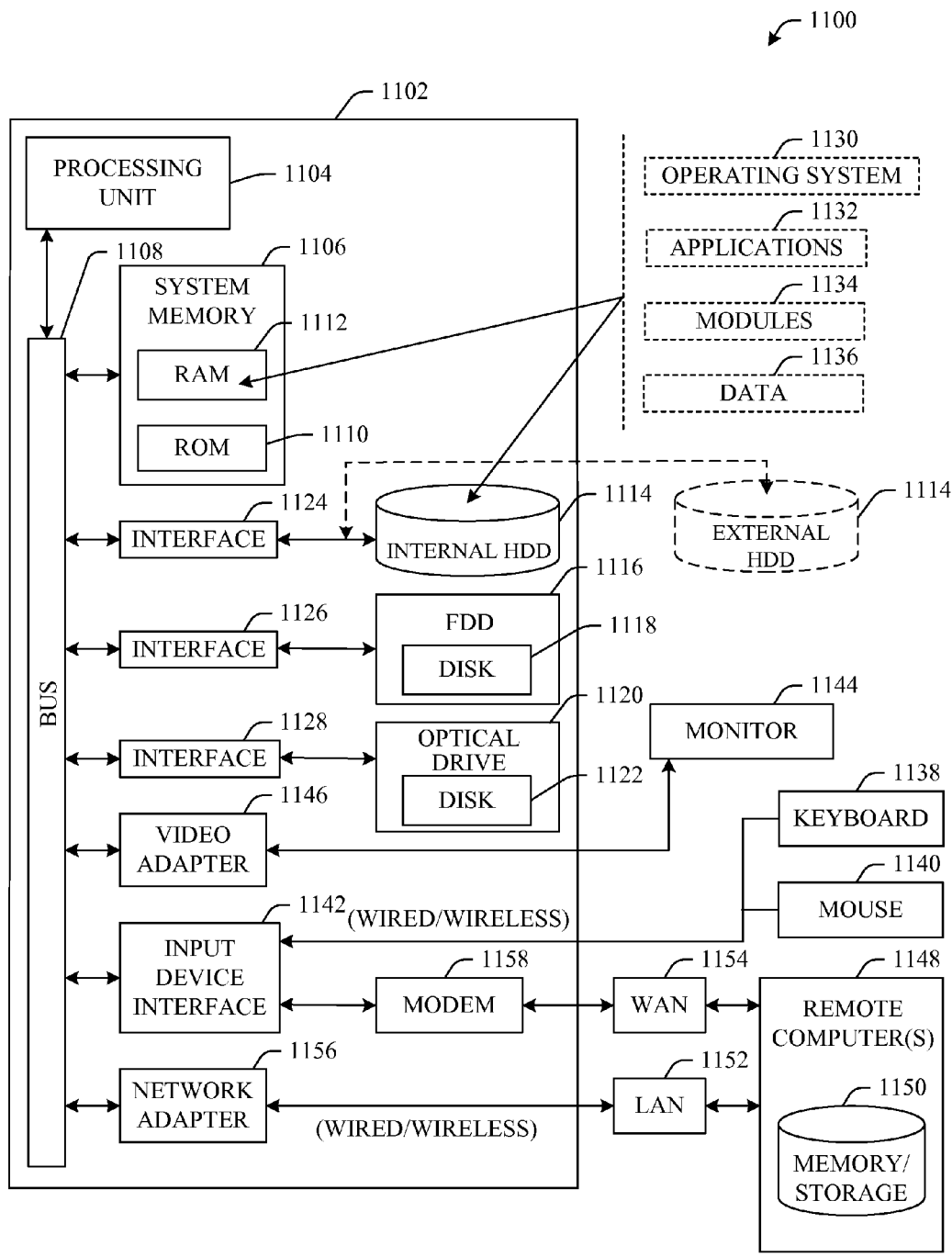
FIG. 11A illustrates a block diagram of a computer operable to execute the disclosed architecture.

Referring now to FIG. 11A, there is illustrated a block diagram of a computer operable to execute the disclosed architecture. In order to provide additional context for various aspects of the subject innovation, FIG. 11A and the following discussion are intended to provide a brief, general description of a suitable computing environment 1100 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11A, the exemplary environment 1100 for implementing various aspects of the innovation includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the innovation can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11B:
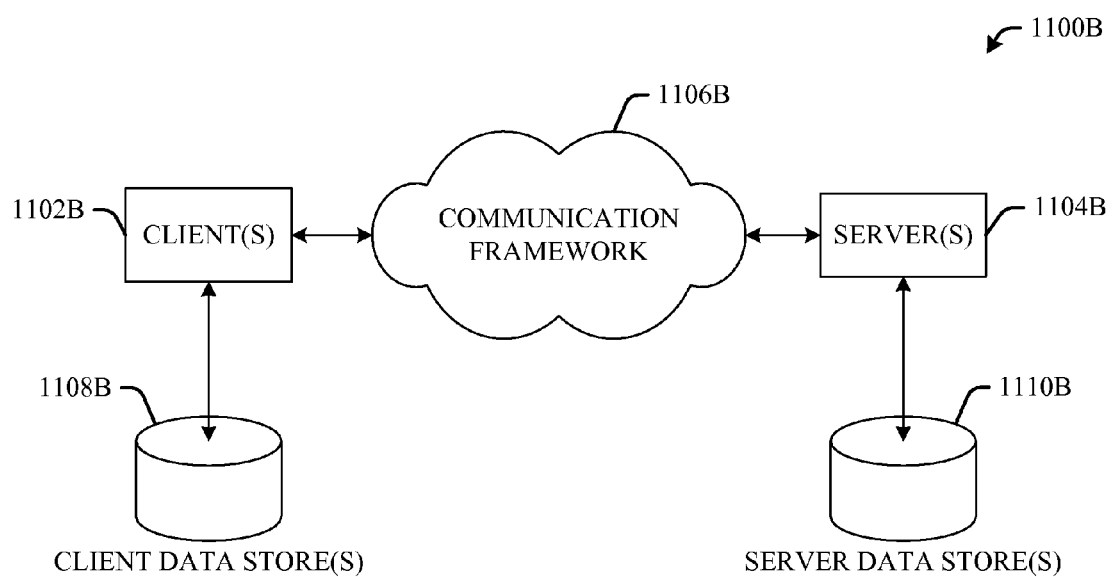
FIG. 11B illustrates a schematic block diagram of an exemplary computing environment in accordance with the subject innovation.

Referring now to FIG. 11B, there is illustrated a schematic block diagram of an exemplary computing environment 1100B in accordance with the subject innovation. The system 1100B includes one or more client(s) 1102B. The client(s) 1102B can be hardware and/or software (e.g., threads, processes, computing devices). The client(s) 1102B can house cookie(s) and/or associated contextual information by employing the innovation, for example.

The system 1100B also includes one or more server(s) 1104B. The server(s) 1104B can also be hardware and/or software (e.g., threads, processes, computing devices). The servers 1104B can house threads to perform transformations by employing the innovation, for example. One possible communication between a client 1102B and a server 1104B can be in the form of a data packet adapted to be transmitted between two or more computer processes. The data packet may include a cookie and/or associated contextual information, for example. The system 1100B includes a communication framework 1106B (e.g., a global communication network such as the Internet) that can be employed to facilitate communications between the client(s) 1102B and the server(s) 1104B.

Communications can be facilitated via a wired (including optical fiber) and/or wireless technology. The client(s) 1102B are operatively connected to one or more client data store(s) 1108B that can be employed to store information local to the client(s) 1102B (e.g., cookie(s) and/or associated contextual information). Similarly, the server(s) 1104B are operatively connected to one or more server data store(s) 1110B that can be employed to store information local to the servers 1104B.

Figure 12:
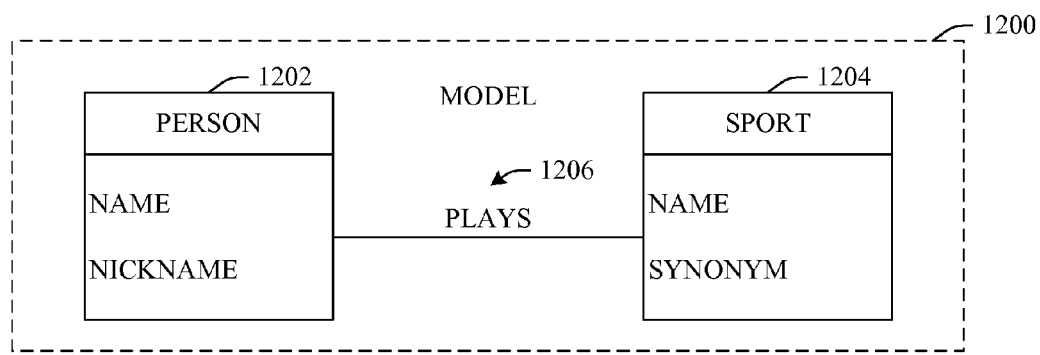
FIG. 12 is one embodiment of an example model of an ontology that includes two concepts and a relationship that links the two model concepts.
Figure 13:
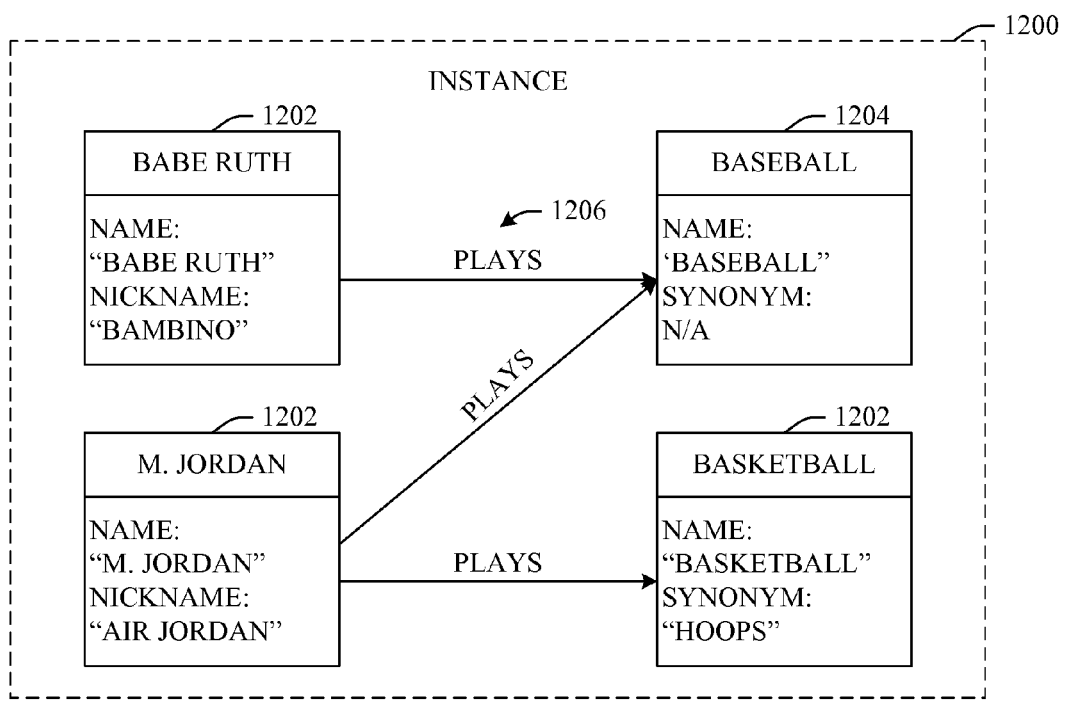
FIG. 13 illustrates one instance of the model of FIG. 12.

Continuing with the aforementioned sports example, the following aspect is included to add perspective to the innovation and is not intended to limit the innovation in any way. FIG. 12 illustrates one embodiment of an example model of an ontology that includes two concepts and a relationship that links the two model concepts. FIG. 13 illustrates one instance of the model of FIG. 12.

It is to be appreciated that the following example is provided to add context to the innovation. As such, this example is not intended to limit the scope of the innovation in any manner. In one embodiment, an ontology in a sports domain can be created to include models that represent various concepts, such as types of sports, teams, players, and coaches. In addition, the sports domain ontology can include explicit relationships between any of these concepts. In addition to ontological relationships that have been defined between models, relationships can exist between the concepts and articles of one or more sports columnists. For example, a model of the sport "Baseball" could be linked to articles written about baseball. Similarly, a model of the sport "Basketball" could be linked to one or more articles written about basketball. In addition, a model of the player "Babe Ruth" could be linked to one or more articles written about Babe Ruth and the model of the player, for example, "Michael Jordan" could be linked to one or more articles written about Michael Jordan.

A system utilizing these models could then use statistical inferencing techniques to determine that the model of "Babe Ruth" has a correlation to the model of "Baseball" and no correlation to the model of "Basketball" in the linked articles. Thus, this system could determine that Babe Ruth was a baseball player. Similarly, such a system could compute that the model of "Michael Jordan" has a correlation to the model of "Basketball" and also a correlation to the model of "Baseball"; therefore, the system could determine that "Michael Jordan" was a basketball player and that he was also a baseball player. Techniques to determine the correlation between data sets are well known to those of skill in the art.

FIG. 12 illustrates one embodiment of an ontology model 1200 in the sports domain. The ontology model 1200 explicitly models two concepts, athletes 1202 and sports 1204, and shows the relationships 1206 between the athletes 1202 and the sports 1204.

The model 1200 of FIG. 12 includes two concepts 1202, 1204 and a relationship 1206 that describes how the two concepts 1202, 1204 are related or linked to one another. In the example provided, the first concept 1202 is a data structure used to describe a person. The data structure includes fields for the person's name and nickname. Similarly, the second concept 1204 is a data structure used to describe a sport. The data structure includes fields for the sport's name and synonym. The relationship 1206 includes a "plays" relationship, which identifies which person plays which sport.

FIG. 13 illustrates one instance of the model of FIG. 12. In the model 1200 of FIG. 13, the relationships 1206 between various concept 1202, 1204 instances have been assigned. For example, the model 1200 has been configured to indicate that the Babe Ruth person concept plays the baseball sport concept. Similarly, the model 1200 has been configured to indicate that the Michael Jordan person concept plays both the baseball and basketball sport concepts. In the foregoing example, Babe Ruth and Michael Jordan are particular instances of the person concept 1202, and baseball and basketball are particular instances of the sport concept 1204.

In addition, the data structures associated with each concept instance have been populated with known information. For example, the ontological model includes nicknames for the Babe Ruth, Michael Jordan and Basketball concept instances, as shown.

Figure 14:
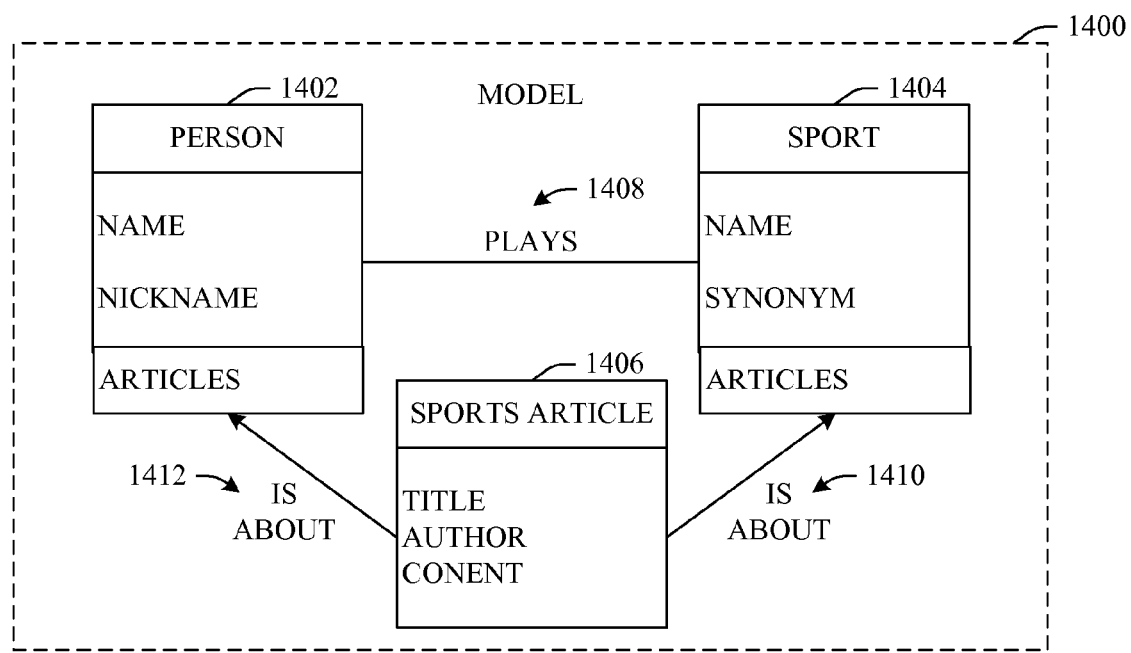
FIG. 14 illustrates one embodiment of a model of an ontology that includes three concepts and relationships between the model concepts.

In the embodiment of FIG. 14, an ontological model 1400 includes three concepts 1402, 1404, and 1406 and three relationships 1408, 1410, and 1412 that define the relationships between each of the concepts 1402, 1404, and 1406. For example, the first relationship 1408 defines which person concept 1402 plays which sport concept 1404. The second relationship 1404 defines which sports article concept is about which sport concept 1404. Similarly, the third relationship 1412 defines which sports article concept 1406 is about which person concept 1402.

In addition, each concept 1402, 1404, and 1406 includes a data structure with fields to identify additional information regarding instances of each concept 1402, 1404, and 1406. For example, the person concept 1402 includes fields associated with a person's name, nickname, and article related to that person. Similarly, the sport concept 1404 includes fields associated with a sport's name, synonym, and articles related to that sport. The sports articles concept 1406 includes fields associated with a sports article's title, author, and content.

The fields of the sports article concept can be populated by extracting data from a data source containing information relevant to sports articles. For example, an online sports magazine or newspaper can be automatically monitored, and data source content relevant to the sports article concept 1406 can be automatically extracted to populate its data fields. Methods of automatically monitoring online data sources are well known to those of skill in the art.

Figure 15:
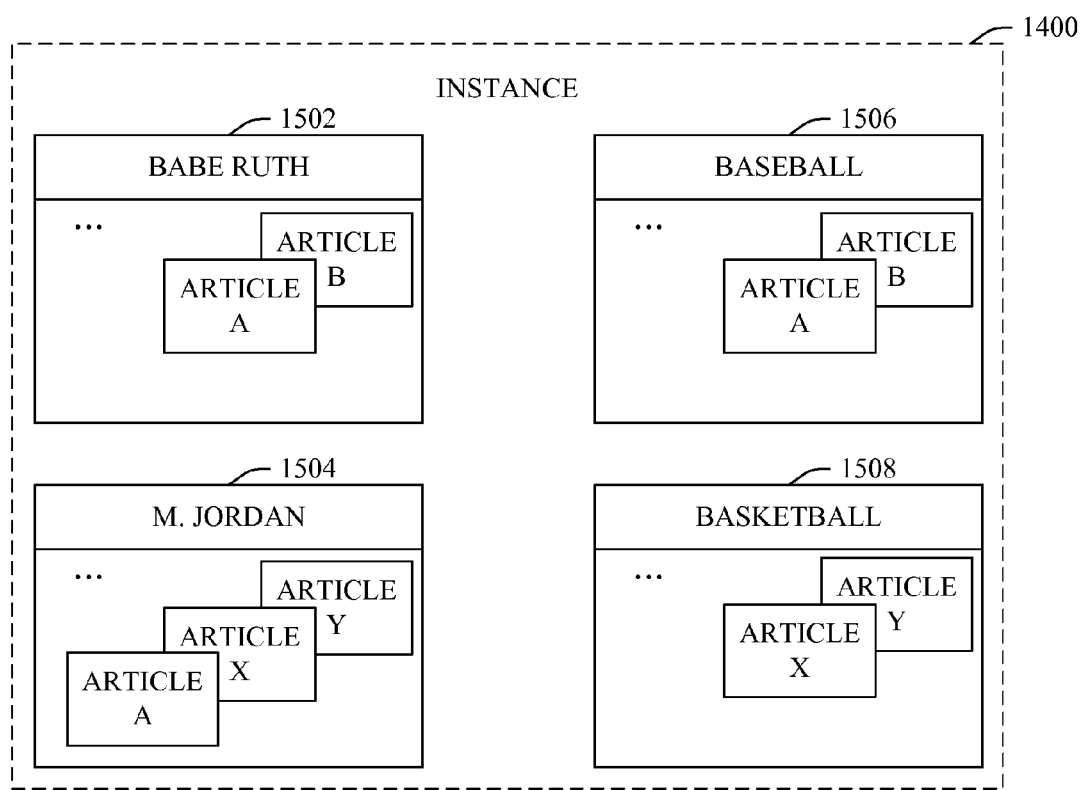
FIG. 15 illustrates one instance of the model of FIG. 14 where three concept instances each include two data source items and one concept instance includes three data source items.

FIG. 15 illustrates an instance of the model 1400 of FIG. 14 where instances of the person concept 1402 and sport concept 1404 have been assigned. In addition, the model 1400 has associated various articles with each concept instance. By using embodiments of a method of the innovation discussed in greater detail below, an ontological system utilizing a model such as illustrated, can infer relationships between the person concept instances 1502, 1504 and the sport concept instances 1506, 1508.

For example, as illustrated FIG. 16, the ontological system can generate a correlation table 1600 that provides a correlation value between each person concept instance 1502, 1504 and each sport concept instance 1506, 1508. In the illustrated example, the correlation table 1600 indicates: there are two sports articles relevant to both Babe Ruth and baseball; there is one sports article relevant to both Michael Jordan and baseball; there are no sports articles relevant to both Babe Ruth and basketball; and that there are two sports articles relevant to both Michael Jordan and basketball.

Figure 17:
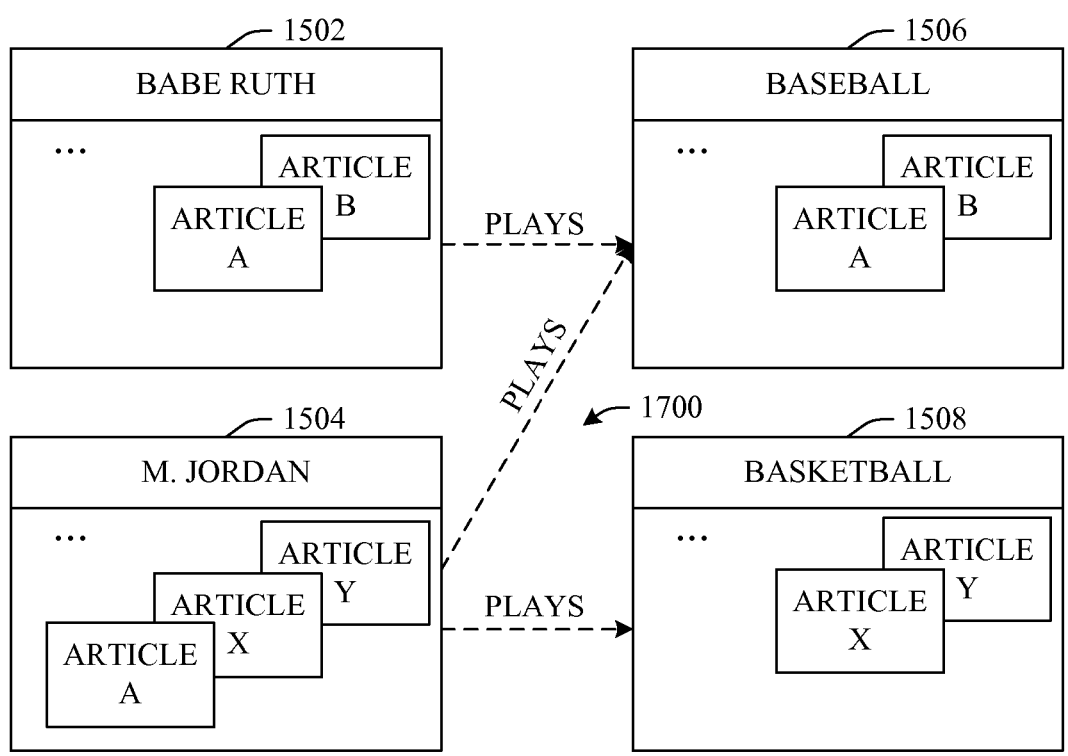
FIG. 17 illustrates one embodiment of the model of FIGS. 14-16 where relationships between concept instances have been determined based upon the correlation values of FIG. 16.

Based upon this information, the ontological system can calculate or infer a relationship 1700 between the person concept instances 1502, 1504 and the sport concept instances 1506, 1508, as illustrated in FIG. 17. The calculation can include numerical and/or statistical analysis. For example, the calculation can determine that a relationship exists between model concepts if correlation table values exceed a predetermined or calculated threshold level. Alternatively, the calculation can determine that a relationship exists between model concepts after sorting correlation values to determine relative relevance and selecting a predetermined or calculated number of sorted correlation values. Other calculation methods are described below.

Figure 18:
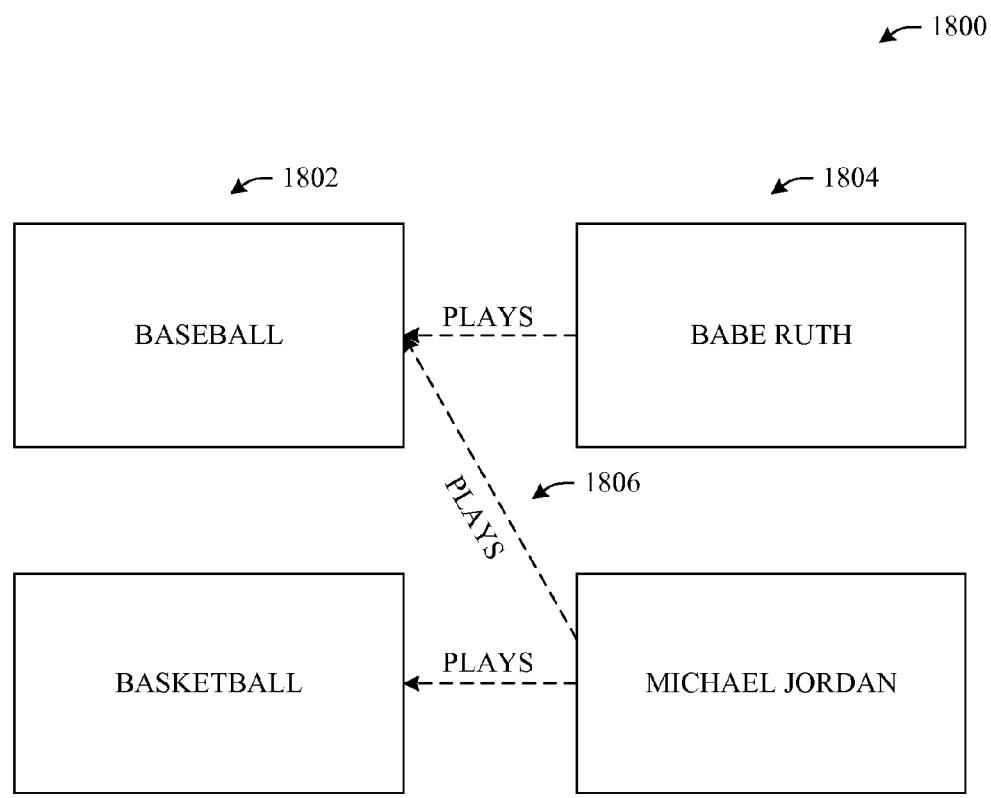
FIG. 18 illustrates one embodiment of an ontological model.
Figure 19:
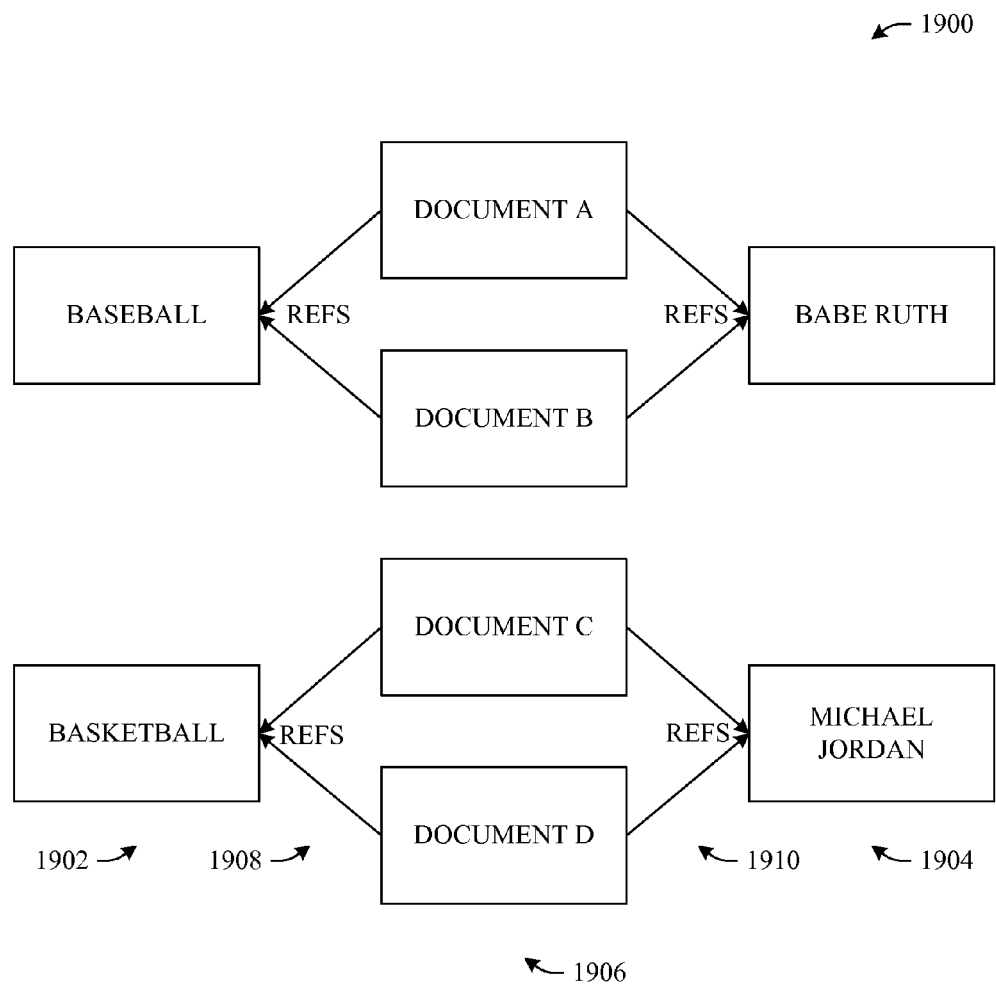
FIG. 19 illustrates yet another embodiment of an ontological model.

In another embodiment illustrated FIG. 18, an ontology model 1800 also models sports 1802 and athletes 1804. Similarly, yet another ontology model is illustrated in FIG. 19. In the embodiment of FIG. 19, instead of including explicit relationships between the sports 1902 and athletes 1904, the ontology 1900 models documents 1906, first relationships 1908 between sports 1902 and documents 1906, and second relationships 1910 between athletes 1904 and documents 1906. A system utilizing this ontology 1900 can then infer relationships between each one of the sports 1902 and each one of the athletes 1904. The system can then determine a score related to each of the inferred relationships to compute a relative weighting, as illustrated FIG. 16. In this manner, a qualitative assessment is determined for each inferred relationship by the system.

The ontology in such an embodiment can be used to draw numerical information from the various sources of information as they pertain to specific components of the ontology. The numerical information generated by connecting or associating the ontology to the content can be referred to as "statistics."

In addition to generating relationships between models of the ontology, and between models and data sources, such a system can also dynamically discover a relationship between a foreign concept or model that does not exist in the ontology and one that does have a model in the ontology. For example, such a system could also discover a relationship between or among concepts that have not been modeled in the ontology (but may be modeled in another external ontology) and concepts that have been modeled in the ontology. If the concept of a home run was not modeled in the ontology, the phrase "home run" could still be queried against the set of articles and then correlated to any of the models in the ontology. Such a system could be configured to compute or discover a correlation to the model of "Baseball" and could determine that baseball may be relevant to the query. One such method of dynamically discovering relationships and determining correlation between model concepts is described in greater detail above with respect to FIG. 2.

Figure 20:
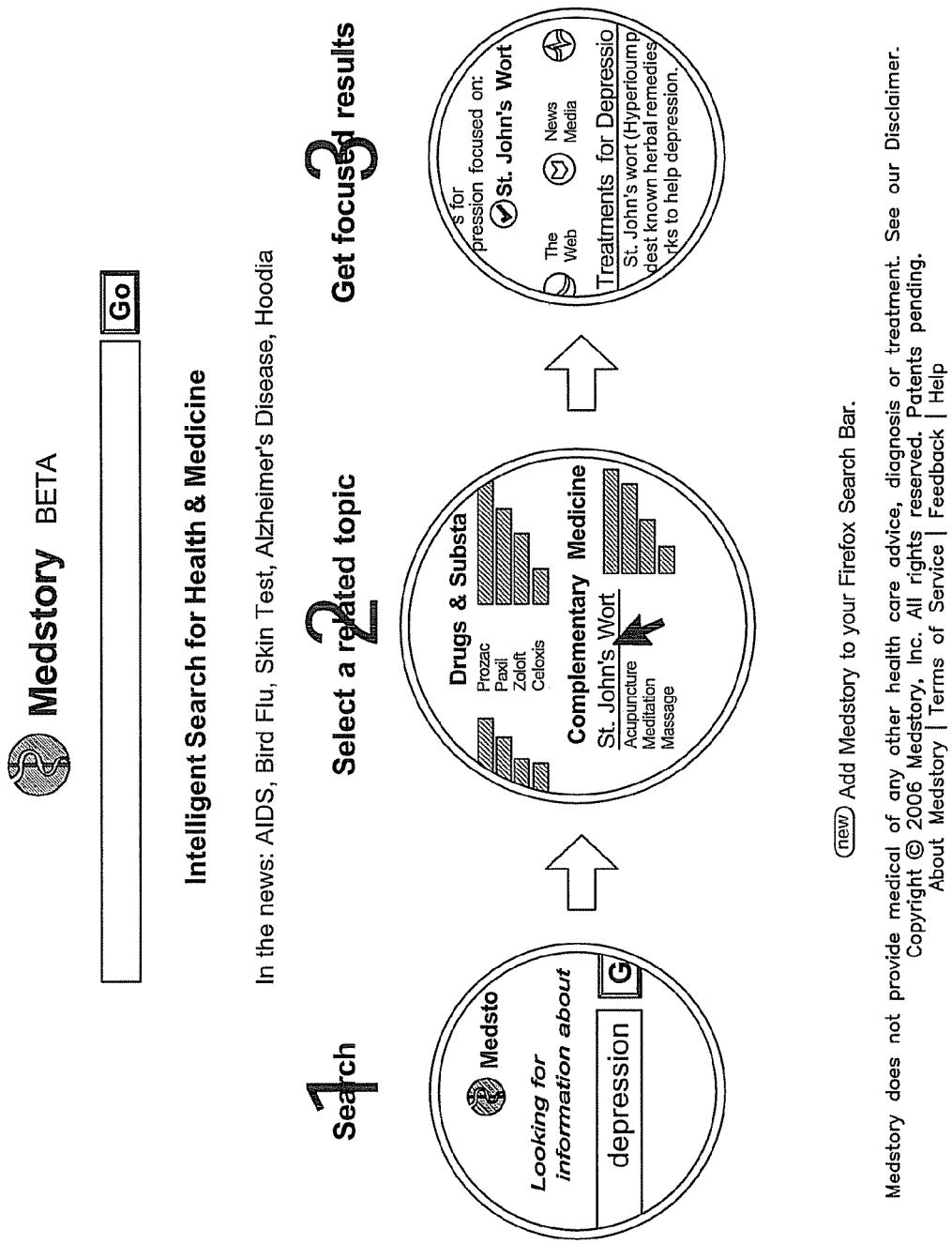
FIG. 20 illustrates one embodiment of a web page that contains a feature showing relevant concepts related to health that have recently appeared or been in the news.
Figure 21:
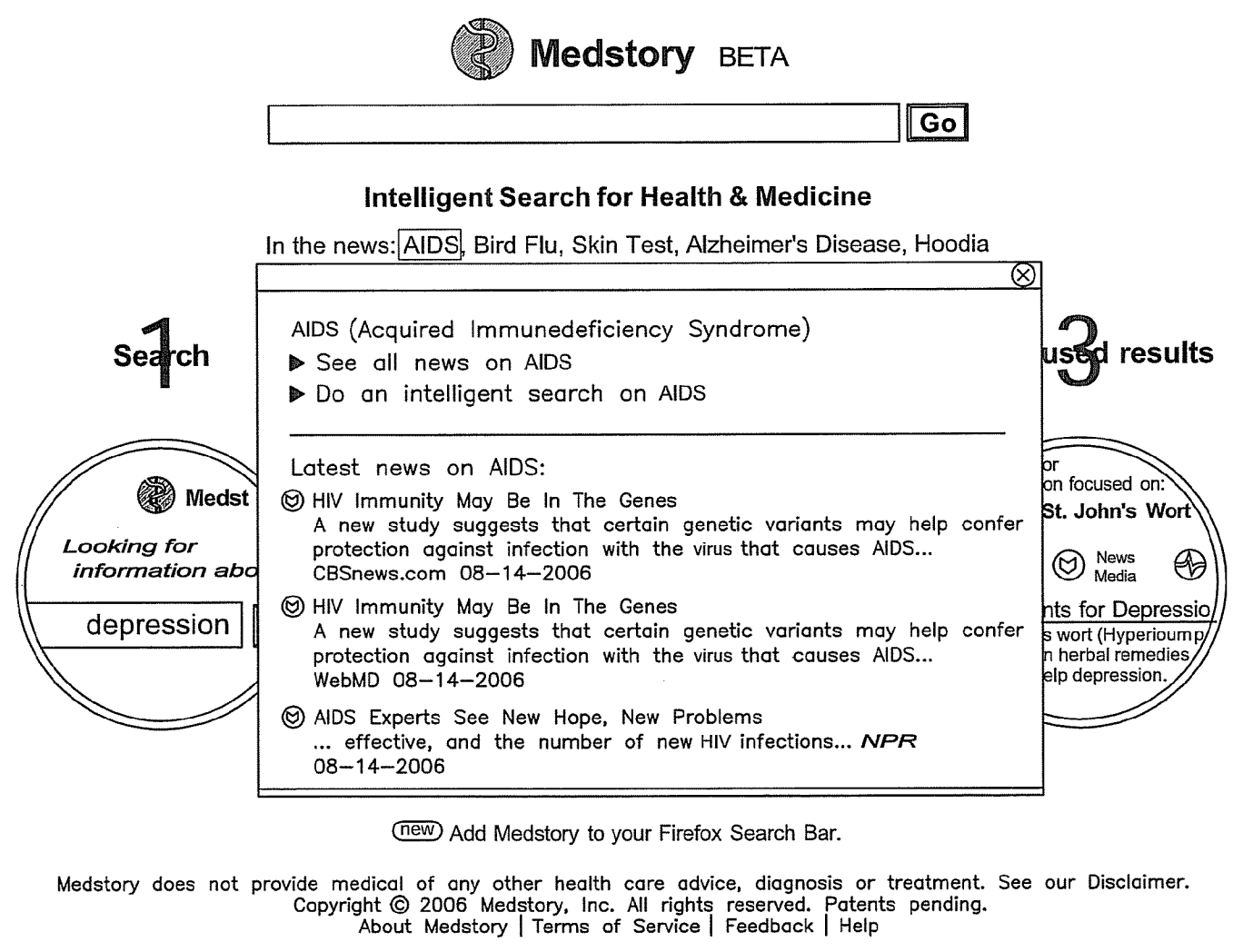

In one information news analysis embodiment, an information searching system, such as a search engine, determines what concepts are "in the news." Examples of web pages that illustrate the following functionality are shown in FIGS. 20 and 21. By way of example, the information searching system determines which concepts are being written about in the media (e.g., news articles, new content, new publications, user-generated content, blogs, new data).

As discussed above, a relevance equation can be expressed as:

$$r_{cq} = w(c) \sum_i [w(i) f(h_c, h_q)]$$

The information searching system can simplify the original equation if no query is performed on the system with specific keywords. In such a case, the ranking of concepts can be determined by calculating a relevance score (rc) for a concept c, using i data sources items (such as news articles). As a result, the relevance score (rc) can be expressed as:

$$r_c = w(c) \sum_i [w(i) f(h_c)]$$

where:
w(c)=weighting function for the concept, c
w(i)=weighting function for the data source item, i
$h_c$=set of items related to concept c The term "data source items" is a broad term intended to have its ordinary meaning. In addition, the term "data source items" can refer to individual entries or particular items of information in a single data source or a plurality of data sources, such as a news article in a news information database.

In a another embodiment, the information searching system can decide to ignore or not consider concept relationships, or treat or consider them as part of the weighting functions and set f(hc)=1, reducing the equation to:

$$r_c = w(c) \sum_i [w(i)]$$

The weighting function for the data source item may be dependant upon the source of the item. For example, in some embodiments a high value source, such as a professional news source, news wire, etc., is weighted more heavily than a lower valued source, such as a newsgroup posting, individual blog, etc. The weighting function for the data source item may also be dependant upon the time the data source item was published. For example, in some embodiments, the weighting function includes a function that gives zero weight to older items, or a decay function that reduces the value of the data source item over time. This functionality provides the additional benefit of treating current news and information more relevant than older news and information.

The weighting function for either the concept or data source item may also be dependant upon its relevance to the user. For example, in some embodiments a higher weight is given to data sources that address the user's stated or inferred interests.

Using the above equations, methods, and/or functions, the information searching system determines the relative scores for concepts and ranks them accordingly. In one embodiment, each concept's score is calculated in turn, or sequentially.

In another embodiment, the recent news items are iterated through and a running score is determined and stored for each concept discussed in that set of news items. After all of the data items are iterated through, the scores are tallied and the weighting function for the concept w(c) can be applied to each scoring concept, or to the top number of concepts to arrive at a final score for those concepts.

Another illustrative embodiment of determining concepts in the news follows. Referring now to the table below:

|  | New York Times | | Sports Illustrated | |
| --- | --- | --- | --- | --- |
|  | January | February | January | February |
| Articles containing the concept of the sport Basketball | 2 | 3 | 20 | 28 |
| Articles containing the concept of the person Michael Jordan | 1 | 1 | 10 | 8 |

The method includes or utilizes a weighting function for the data source item that depends solely upon an arbitrary weighting of the data source. For example, in one embodiment, if the New York Times writes far fewer articles about sports than other predetermined or selected news sources, the articles that it does write are considered more influential in the scoring. Therefore, the method assigns w(i)=2 for any article, i, from the New York Times, and w(i)=1 for any article from Sports Illustrated.

The method also includes or utilizes a weighting function for the concepts. The method assigns an arbitrary weight w(c) to concepts of 'Sports' such as 'Basketball' of 1, such that w(c)=1. The method also assigns a higher weight to concepts of 'People', for example w(c)=5. Using this approach the method can recognize that the system should be more sensitive to the appearance of certain concept types and less sensitive to others.

Continuing with this example, the method can determine the relative relevance scores for both Michael Jordan and Basketball for February:

$$r_{MichealJordon}=5*(2*1+1*8)=40$$

$$r_{Basketball}=1*(2*3+1*28)=32$$

Thus, for the month of February, Michael Jordan is ranked ahead of Basketball.

In other embodiments, the weighting functions are calculated more objectively by, for example, utilizing or involving a function that depends upon the total number of articles written in a source, or the total number of articles written for a concept type. For example, the concept weighting function, w(c), could be represented by:

$$w(c) = \frac{\sum_{c_{parent}} c_{parent}}{\sum_{c_{parent}} [i_{parent}]}$$

where:

$c_{parent}$=a concept that is a member of the same parent class of the concept type, c $i_{parent}$=the total number of data source items connected to the $c_{parent}$ type.

In one embodiment, such a concept weighting function is used to penalize a concept that is in an area of interest that is often in the news. For example, if 'Sports' as an area of interest is in the news much more than 'Board Games' as an area of interest, the concept of 'Basketball,' which is a member of the 'Sports' area of interest, would get penalized in the relevance scoring relative to the concept of 'Chinese Checkers,' which is a member of the 'Board Game' area of interest. In an alternative embodiment, a look-up table could be used to determine w(c).

In other embodiments, the method could be performed against or utilizing a subset of content matching a query q, and the f(hc,hq) term could be used, as discussed above.

Following is a discussion of displaying and extending content and/or results in accordance with aspects of the innovation. The methods described herein of performing a news information analysis can further include additional analytics that provide interesting displays of content. For example, in one embodiment, clicking on a concept displayed on a web page, such as a search engine web page, or a search results web page, displays, or causes another window or screen to open, which displays any one or more of:

(a) other related concepts (for example, through the recent news, semantically related, or historically related);

(b) content related to the concept such as recent news involving the concept;

(c) other premium content related to the recent news and/or concept;

(d) content related to the user's search history or other personal stated or inferred interests; and/or (e) trending or temporal analytics, such as when and how often the concept has been featured in the news.

FIG. 20, illustrates one embodiment of a web page that contains a feature showing relevant concepts related to health that have recently appeared or been in the news. In this case, the top five ranked concepts are shown. FIG. 21 illustrates an embodiment of a web page after a user has clicked on a particular concept, e.g., the concept "AIDS." As a result of clicking on the concept, a new window has appeared that gives the user information about the concept, and in this case, shows some recent articles that have appeared in the news about the concept.

In addition to the features shown, in other embodiments, the method categorizes news articles by extracting one or more of the concepts discussed in the articles and examining their differences. In one scenario, a news article can be compared with a second news article and the similarity of the two articles can be scored based upon the overlap of the concepts discussed in the two articles. Thus, related articles can be grouped or categorized together if they reach a threshold with their similarity score. In one implementation, a similarity score may be expressed as:

Similarity Score=(the number of matching concepts)−(the number of unmatching concepts from article 1)−(the number of unmatching concepts from article 2)

In other embodiments, additional variables, such as a news article's publication date, is also be taken into account in determining the similarity score for comparing two articles. For example, a ranking or rating of the difference between articles' publication dates, or the difference in days itself, can be added to or subtracted from the values provided above to calculate the similarity score.

By utilizing the methods described herein, a user can then find "related articles" that have a high similarity score with a particular news article. The method described herein can further utilize or be combined with other methods of determining relative articles, such as Natural Language Processing (NLP) techniques.

Many of the embodiments of the methods, devices and systems described herein utilize a concept-based approach that provides several advantages for a known domain. For example, in several embodiments, it bases similarity scores upon important concepts and does not return false-positives purely due to seemingly similar bodies of text.

Although this innovation has been disclosed in the context of certain embodiments, it will be understood by those skilled in the art that the innovation extends beyond the specifically disclosed embodiment to other alternative embodiments and/or uses of the innovation and modifications and equivalents thereof. In particular, while the domain knowledge-assisted information processing system and methods have been described in the context of a particularly preferred embodiment, the skilled artisan will appreciate, in view of the disclosure, that certain advantages, features and aspects of the information communication system, device, and method may be realized in a variety of other applications and software systems. Additionally, it is contemplated that various aspects and features of the innovation described can be practiced separately, combined together, or substituted for one another, and that a variety of combination and sub-combinations of the features and aspects can be made and still fall within the scope of the innovation.

Those of skill in the art will understand that information and signals can be represented using a variety of different technologies and techniques. For example, data, instructions, commands, information, signals, bits, symbols, and chips that can be referenced throughout the above description may be represented by voltages, currents, electromagnetic waves, magnetic fields or particles, optical fields or particles, or any combination thereof.

Those of skill in the art will further appreciate that the various illustrative logical blocks, modules, circuits, and algorithm steps described in connection with the embodiments disclosed herein can be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the innovation.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The acts of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or other form of storage medium known in the art. A storage medium is coupled to the processor, such that the processor can read information from, and write information to, the storage medium. In the alternative, the storage medium can be integral to the processor. The processor and the storage medium can reside in an ASIC. The ASIC can reside in a user terminal. The processor and the storage medium can reside as discrete components in a user terminal.

The previous description of the disclosed embodiments is provided to enable a person skilled in the art to make or use the innovation. Various modifications to these embodiments will be readily apparent to those skilled in the art, and the generic principles defined herein can be applied to other embodiments without departing from the spirit or scope of the innovation.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising at least one processor and at least one computer-readable storage medium storing instructions executable by the at least one processor to implement:
    an ontology configured to maintain a plurality of models relevant to a plurality of domains;
    a domain processing system component configured to
        process a query based upon the ontology,
            assign a relevance score to at least one item of information within a domain of the ontology with respect to the query, based at least in part on a relationship of at least one data source item to one or more concepts of the ontology,
        render a plurality of domain knowledge-assisted results of the processed query; and
        repeating the cycle of the process, assign and render steps until one of a steady-state of results is obtained or a predetermined state is reached; and
    a query expander configured to generate an expanded query from the query by injecting statistically significant terms based on frequently occurring keywords from the ontology linked to domain content sources, such that an advertisement from an advertiser is displayed with the results of the query when the expanded query matches a concept subscribed to by the advertiser.

2. The system of claim 1, the ontology being configured to maintain-associations and relationships among the plurality of models.

3. The system of claim 1, the ontology being configured to be dynamically updated by a software agent to keep information synchronized with the plurality of domains.

4. The system of claim 1, further comprising a search service component configured to execute a search as a function of the query and return the plurality of domain knowledge-assisted results to the domain processing system, the search service component including at least one of a crawler, a content indexer, a content scorer or a searcher.

5. The system of claim 1, each of the plurality of search results representing a component within the ontology.

6. The system of claim 1, each of the plurality of search results representing a relation found pertinent within the ontology.

7. The system of claim 1, further comprising an ontology/knowledge base connector configured to extract information from the ontology, a subset of the information being employed in processing the query.

8. The system of claim 1, further comprising a role/domain focuser configured to modify a search to generate the query, based at least in part on a role of a user associated with the query.

9. The system of claim 1, further comprising a concept expander configured to employ synonyms of keywords within a search to generate the query.

10. The system of claim 1, further comprising a vocabulary mapper configured to extend a search with alternative keywords to generate the query.

11. The system of claim 1, further comprising a statistical enhancer configured to target the plurality of domain knowledge-assisted results by injecting statistically significant terms into the query based upon one of frequency analysis or co-occurring keywords from the ontology.

12. The system of claim 1, further comprising a results processor component configured to refine the plurality of domain knowledge-assisted results prior to rendering.

13. The system of claim 12, further comprising a results ranker component configured to reorder a subset of the plurality of domain knowledge-assisted results.

14. The system of claim 12, further comprising a connection analyzer configured to link the plurality of domain knowledge-assisted results to one of concepts or items in the ontology, the linked results configured to assist at least one of navigation of the plurality of domain knowledge-assisted results or visualization of concepts involved.

15. A computer-implemented method comprising using at least one processor to execute instructions stored on at least one computer-readable storage medium to perform operations including:
- receiving a query;
- enriching the query to produce an enriched query based upon a domain-specific ontology by injecting statistically significant terms based on frequently occurring keywords from an ontology linked to domain content sources;
- determine if any concepts related to the enriched query represent concepts in the ontology that should also be used in domain-specific ways to improve the enriched query, either by one of modifying it or by introducing additional queries that are related to the query that should also be performed locating a plurality of domain-specific results as a function of the enriched query;
- ranking the plurality of domain-specific results as a function of the domain-specific ontology;
- repeating the cycle of the receiving, enriching, determine and ranking steps until one of a steady-state of results is obtained or a predetermined state is reached; and
- displaying an advertisement from an advertiser with the results of the query when the enriched query matches a concept subscribed to by the advertiser.

16. The method of claim 15, further comprising employing one of a preference or a role to enrich the query.

17. The method of claim 16, further comprising:
- analyzing a subset of the plurality of domain-specific results; and
- locating an additional set of domain-specific results based upon a query as a function of the analyzed subset of domain-specific results.

18. A computer-readable storage medium storing instructions executable by a computing device to perform operations comprising:
- maintaining an ontology, the ontology representing relationships between a plurality of domain-specific models;
- determining a relevance of content of the domain-specific models to a query based at least in part on a strength of at least one relationship of the content to one or more concepts of the ontology;
- enriching the query based upon the ontology by injecting statistically significant terms based on frequently occurring keywords from an ontology linked to domain content sources;
- locating a plurality of results based upon the enriched query;
- repeating the cycle of the determining, enriching and locating steps until one of a steady-state of results is obtained or a predetermined state is reached; and
- displaying an advertisement from an advertiser with the results of the query when the enriched query matches a concept subscribed to by the advertiser.

19. The computer-readable storage medium of claim 18, the operations further comprising expanding content of the query based upon synonyms of keywords in the query.

* * * * *